(12) United States Patent
Omagari et al.

(10) Patent No.: US 10,715,697 B2
(45) Date of Patent: Jul. 14, 2020

(54) IMAGE PROCESSING METHOD THAT DETERMINES A NUMBER OF BLOCKS FOR EMBEDDING INFORMATION BASED ON A SIZE OF AN IMAGE TO BE PRINTED, IMAGE PROCESSING APPARATUS, AND STORAGE MEDIUM

(71) Applicant: CANON KABUSHIKI KAISHA, Tokyo (JP)

(72) Inventors: Yuki Omagari, Tokyo (JP); Mitsuru Uratani, Kawasaki (JP); Hiroyuki Sakai, Chigasaki (JP); Yuki Ishida, Kawasaki (JP); Tomohiro Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 14 days.

(21) Appl. No.: 16/019,874

(22) Filed: Jun. 27, 2018

(65) Prior Publication Data

US 2019/0005364 A1    Jan. 3, 2019

(30) Foreign Application Priority Data

Jun. 28, 2017 (JP) .................. 2017-126765

(51) Int. Cl.
*G06T 1/00* (2006.01)
*H04N 1/32* (2006.01)
(Continued)

(52) U.S. Cl.
CPC ......... *H04N 1/32352* (2013.01); *B41M 3/10* (2013.01); *G06F 3/1243* (2013.01); *G06T 1/005* (2013.01);
(Continued)

(58) Field of Classification Search
CPC combination set(s) only.
See application file for complete search history.

(56) References Cited

U.S. PATENT DOCUMENTS 5,828,794 A   10/1998   Katayama et al.
6,959,385 B2  10/2005   Murakami et al.
(Continued)

FOREIGN PATENT DOCUMENTS

JP   2008219152 A   9/2008
JP   2009188669 A   8/2009
(Continued)

OTHER PUBLICATIONS

Japanese Office Action issued in corresponding Japanese Application No. 2017126765 dated Jan. 21, 2020.

*Primary Examiner* — Barbara D Reinier
(74) *Attorney, Agent, or Firm* — Venable LLP

(57) ABSTRACT

An image processing method includes: a first obtaining step of obtaining data of an image; a second obtaining step of obtaining additional information; a third obtaining step of obtaining information related to a printable area of a print medium on which the image based on the data obtained in the first obtaining step is printed; determining step of determining a position where the obtained additional information is embedded in the image on the basis of the information obtained in the third obtaining step; and embedding step of embedding the additional information with reference to the determined position.

17 Claims, 22 Drawing Sheets

| 300 dpi PRINTING | PAPER SIZE | | PRINT IMAGE SIZE | | | | MARGIN | |
|---|---|---|---|---|---|---|---|---|
| | | | BORDERED PRINTING | | BORDERLESS PRINTING | | BORDERED PRINTING | BORDERLESS PRINTING |
| | WIDTH | HEIGHT | WIDTH | HEIGHT | WIDTH | HEIGHT | | |
| L SIZE | 1050 | 1500 | 950 | 1400 | 1100 | 1550 | 50 | -25 |
| POSTCARD | 1175 | 1750 | 1075 | 1650 | 1225 | 1800 | 50 | -25 |
| SQUARE | 1500 | 1500 | 1300 | 1300 | 1600 | 1600 | 100 | -50 |
| DISK | 1400 | 1400 | 1400 | 1400 | — | — | 0 | — |

1000

1602

(51) Int. Cl.
*B41M 3/10* (2006.01)
*G06F 3/12* (2006.01)
*G06K 15/02* (2006.01)

(52) U.S. Cl.
CPC .......... *G06T 1/0021* (2013.01); *G06T 1/0035* (2013.01); *H04N 1/32144* (2013.01); *G06K 15/1822* (2013.01)

(56) References Cited

U.S. PATENT DOCUMENTS

| | | |
|---|---|---|
| 8,818,015 B2 | 8/2014 | Nakagata et al. |
| 10,033,904 B2 | 7/2018 | Miyake et al. |
| 2008/0205697 A1* | 8/2008 | Sakai ................... G06T 1/0064 382/100 |
| 2008/0231907 A1* | 9/2008 | Ishii ..................... G06T 1/0021 358/3.28 |
| 2011/0228969 A1 | 9/2011 | Nakagata et al. |
| 2016/0364825 A1* | 12/2016 | Pan ...................... H04N 19/136 |
| 2019/0266749 A1* | 8/2019 | Rhoads ................ G06T 1/0021 |

FOREIGN PATENT DOCUMENTS

| | | |
|---|---|---|
| JP | 2011193302 | 9/2011 |
| JP | 2013097449 A | 5/2013 |
| JP | 2017073653 A | 4/2017 |

\* cited by examiner

01 : <svg xmlns="http://www.w3.org/2000/svg" xmlns:xlink="http://www.w3.org/1999/xlink" width="300" height="400" viewBox="0 0 300 400">
02 : <image width="300" height="400" x="0" y="0" xlink:href="image.jpg"></image>
03 : </svg>

FIG.8A

01 : <svg xmlns="http://www.w3.org/2000/svg" xmlns:xlink="http://www.w3.org/1999/xlink" width="950" height="1400" viewBox="0 0 950 1400">
02 : <image width="950" height="1400" x="0" y="0" xlink:href="image.jpg"></image>
03 : </svg>

FIG.8B

| 300 dpi PRINTING | PAPER SIZE | | PRINT IMAGE SIZE | | | | MARGIN | |
|---|---|---|---|---|---|---|---|---|
| | | | BORDERED PRINTING | | BORDERLESS PRINTING | | BORDERED PRINTING | BORDERLESS PRINTING |
| | WIDTH | HEIGHT | WIDTH | HEIGHT | WIDTH | HEIGHT | | |
| L SIZE | 1050 | 1500 | 950 | 1400 | 1100 | 1550 | 50 | -25 |
| POSTCARD | 1175 | 1750 | 1075 | 1650 | 1225 | 1800 | 50 | -25 |
| SQUARE | 1500 | 1500 | 1300 | 1300 | 1600 | 1600 | 100 | -50 |
| DISK | 1400 | 1400 | 1400 | 1400 | — | — | 0 | — |

```
01 : <?xml version=" 1.0" ?>
02 : <content>
03 :   <papersize>89x127mm</papersize>
04 :   <papertype>photographic</papertype>
05 :   <printquality>normal</printquality>
06 :   <imageData>
07 :     <width>950</width>
08 :     <height>1400</height>
09 :     <format>JPEG</format>
10 :     <data> JPEG DATA </data>
11 :   </imageData>
12 : </content>
```

FIG.11

IMAGE PROCESSING METHOD THAT DETERMINES A NUMBER OF BLOCKS FOR EMBEDDING INFORMATION BASED ON A SIZE OF AN IMAGE TO BE PRINTED, IMAGE PROCESSING APPARATUS, AND STORAGE MEDIUM

BACKGROUND OF THE INVENTION

Field of the Invention

The present invention relates to a technique for embedding additional information in an image.

Description of the Related Art

There is a technique that is called an electronic watermark. In recent years, a technique for embedding additional information in an image has been proposed so as not to be visually recognized the additional information. The image in which the additional information has been embedded is distributed through a network such as the Internet. In addition, a process has been performed of extracting additional information from the image in which the additional information has been embedded. Furthermore, a process has been performed of printing the image in which additional information has been embedded on paper, using an image output apparatus, such as a copier or a printer, and extracts the additional information from the printed material.

Japanese Patent Laid-Open No. 2011-193302 (hereinafter, referred to as PTL 1) discloses a technique related to a marker for detecting the position of additional information when the additional information is read. PTL 1 discloses a technique of arranging position detection marks not only at four corners of a rectangular area of an image but also in the middle of each side forming the area.

In PTL 1, print settings in a case that the image having the additional information embedded therein is printed by the printer are not considered. For example, when additional information is embedded in the entire image used for printing and borderless printing is performed, a portion of the image is likely to be cropped by the trimming of the edge of the image at the printing. If a marker for detecting the position of the additional information is included in the cropped image portion, it is difficult to extract the additional information using the marker. As a result, the amount of additional information that can be read is reduced.

SUMMARY OF THE INVENTION

According to an aspect of the invention, there is provided an image processing method including: a first obtaining step of obtaining data of an image; a second obtaining step of obtaining additional information; a third obtaining step of obtaining information related to a printable area of a print medium on which the image based on the data obtained in the first obtaining step is printed; determining step of determining a position where the obtained additional information is embedded in the image on the basis of the information obtained in the third obtaining step; and embedding step of embedding the additional information with reference to the determined position.

Further features of the present invention will become apparent from the following description of exemplary embodiments with reference to the attached drawings.

BRIEF DESCRIPTION OF THE DRAWINGS

FIGS. 8A and 8B are diagrams illustrating an example of the description of SVG;

FIG. 10 is a diagram illustrating an example of printable area information;

FIG. 11 is a diagram illustrating an example of a print command;

DESCRIPTION OF THE EMBODIMENTS

Hereinafter, preferred embodiments of the invention will be described in detail with reference to the accompanying drawings. However, components described in the following embodiments are just illustrative and the scope of the invention is not limited to the embodiments.

Embodiment 1

<Outline of Image Processing System>

In this embodiment, an image processing apparatus (information processing apparatus) includes an application that can embed and read additional information. The application creates content (image data) in which additional information has been embedded. The image processing apparatus generates print data from the created content and transmits the print data to a printer. The printer performs printing using the print data. A printed material in which the additional information has been embedded is output.

In the present embodiment, the "additional information" means information embedded in a printed material. The additional information is embedded in the printed material so as not to be visually recognized (in some cases, the additional information is added or multiplexed). In some cases, the additional information is referred to as multiplexed information, watermark information, or embedment information.

Next, the configuration of each apparatus will be described first and then the procedure of a printing process using print data having additional information embedded therein will be described.

<Hardware Configuration of Image Processing Apparatus>

Figure 1:
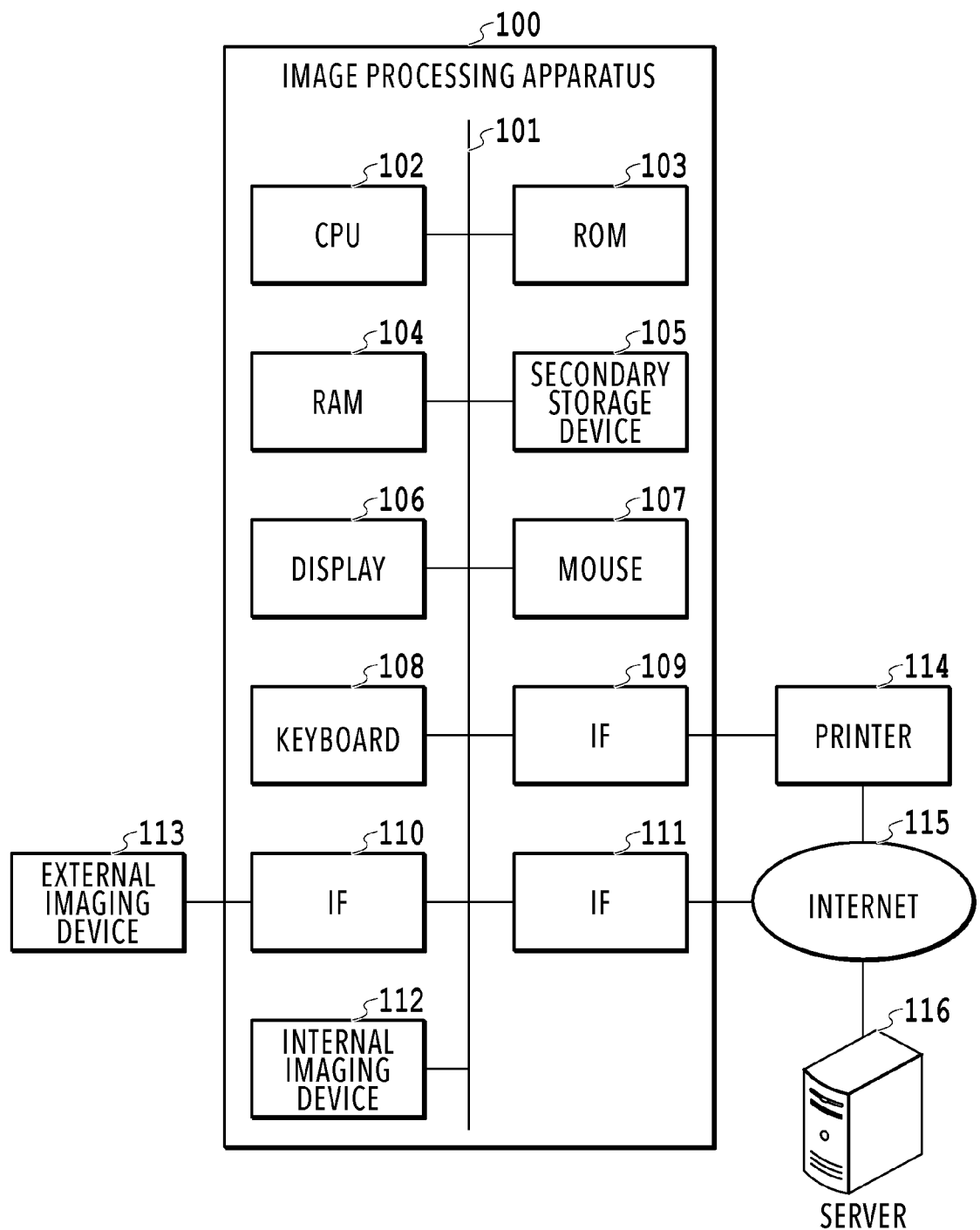
FIG. 1 is a diagram illustrating an example of the hardware configuration of an image processing system.

FIG. 1 is a diagram illustrating an example of the configuration of the image processing system according to the present embodiment. In the image processing system according to the present embodiment, an image processing apparatus 100 (information processing apparatus) and a printer 114 are connected to each other through a network. In FIG. 1, a server 116 is further connected through the network. However, the server 116 may not be necessarily connected.

The image processing apparatus 100 is a portable information terminal, such as a smart phone, a tablet PC, or a notebook PC, or a non-portable desktop PC. Hereinafter, in the present embodiment, it is assumed that a smart phone including a touch display is used as the image processing apparatus 100. The image processing apparatus 100 includes a central processing unit (CPU) 102, a read only memory (ROM) 103, and a random access memory (RAM) 104. In addition, the image processing apparatus 100 includes a secondary storage device 105, a display 106, a mouse 107, a keyboard 108, an interface (IF) 109, an IF 110, an IF 111, and an internal imaging device 112.

The CPU (processor) 102 performs various processes which will be described below according to a program. In FIG. 1, one CPU 102 is illustrated. However, a plurality of CPUs or CPU cores may be provided. The ROM 103 stores the program executed by the CPU 102. The RAM 104 is a memory that temporarily stores various kinds of information in a case where the CPU 102 executes the program.

The secondary storage device 105 is a storage medium such as a hard disk or a flash memory. The secondary storage device 105 stores data, such as a file and a database storing the processing results of image analysis, and various programs. The display 106 displays a user interface (UI) for receiving an operation for implementing various processes or displays various kinds of information such as the results of the executed processes. The display 106 may include a touch sensor (not illustrated). It is assumed that the user inputs a command through, for example, an operation, such as a touch operation, a swipe operation, or a pinch operation. In addition, the display 106 may include a mouse or a keyboard for inputting, for example, characters as the UI.

The internal imaging device 112 captures an image. The captured image data is subjected to predetermined image processing and is then stored in the secondary storage device 105. In addition, image data may be obtained from an external imaging device 113 connected through the IF 110 and then stored in the secondary storage device 105.

The IF 111 can communicate with an external apparatus (for example, the printer 114 or the server 116) through a network such as the Internet 115.

The IFs 109 to 111 have at least one of a wired communication system and a wireless communication system and communicate with the external apparatus according to the communication system used. The image processing apparatus 100 can obtain image data from the server 116 connected to the Internet 115 or the external imaging device 113 through the IFs 109 to 111 and output, for example, image data (print data) to the printer 114 through the IFs 109 to 111. Examples of the wired communication include USB communication and Ethernet (registered trademark) communication. Examples of the wireless communication include wireless LAN communication, near field communication (NFC), Bluetooth (registered trademark) communication, and infrared communication.

Various components of the image processing apparatus 100 are connected to each other through an internal bus 101. The CPU 102 controls various components through the internal bus 101. In the present embodiment, the image processing apparatus 100 is a place (software execution environment) in which software, such as the program executed by the CPU 102 (control unit), is executed.

In the configuration illustrated in FIG. 1, the printer 114 is given as an example of the external apparatus. However, the present embodiment is not limited thereto. The external apparatus may be other image forming apparatuses, such as a multi-function machine (MFP), or a communication apparatus such as a FAX.

<Hardware Configuration of Printer>

Figure 2:
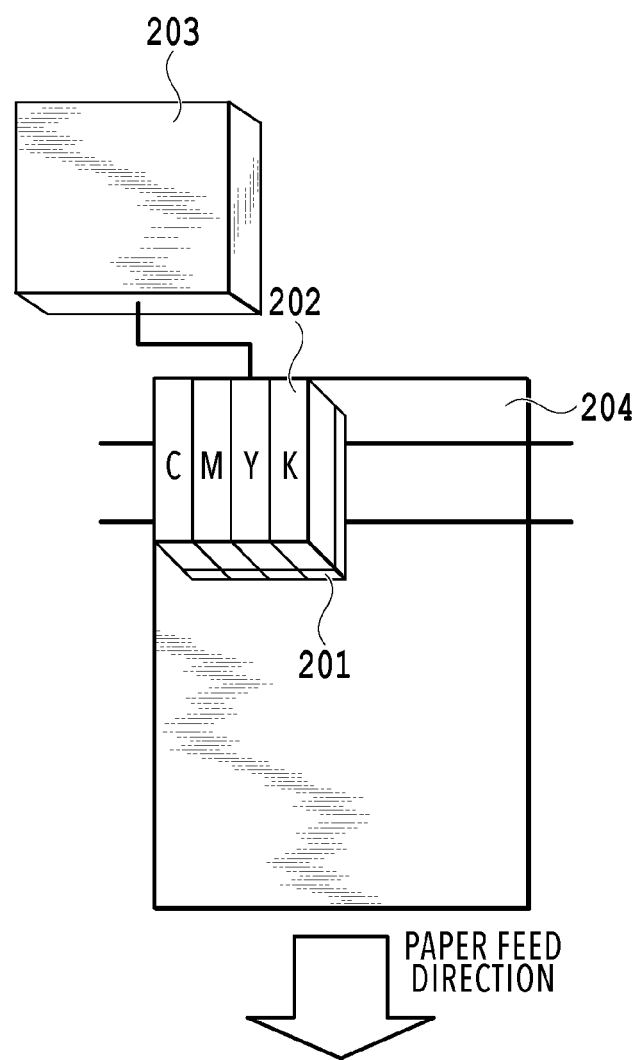
FIG. 2 is a diagram schematically illustrating a print head of a printer.

FIG. 2 is a diagram illustrating a portion of the hardware configuration of the printer 114. In the present embodiment, an ink jet printer 114 is given as an example. However, the present embodiment is not limited thereto. The printer 114 may be an electrophotographic printer.

FIG. 2 is a diagram schematically illustrating a print head of the printer 114 according to the present embodiment. A print head 201 is provided with ink units 202 that are filled with ink. In FIG. 2, the ink units 202 corresponding to four colors are provided. However, the number of colors is not limited thereto. A control circuit unit 203 includes a storage unit, an arithmetic unit, and a communication unit required to drive the print head 201. The print head 201 receives a print signal and a control signal from the control circuit unit 203 and discharges ink based on the print signal in response to the control signal. A print medium 204 which is a recording medium is conveyed by a conveying roller (not illustrated) and an image is formed on the print medium 204.

Figure 3:
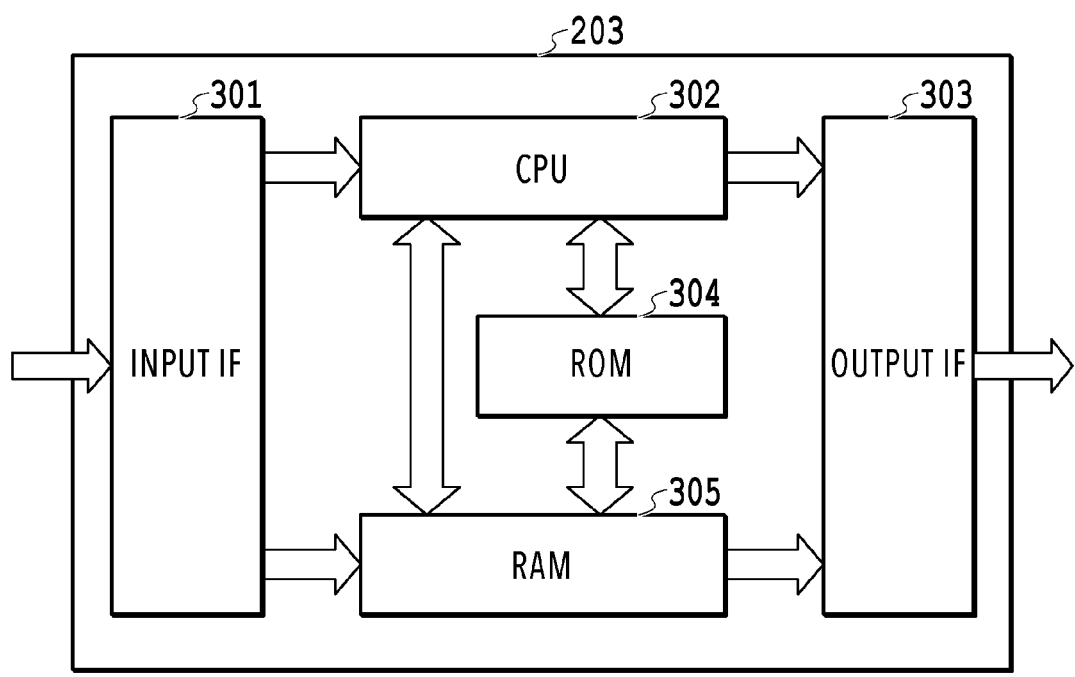
FIG. 3 is a diagram illustrating an example of the configuration of a control circuit unit of the printer.

FIG. 3 is a block diagram illustrating the configuration of the control circuit unit 203. The control circuit unit 203 includes an input interface 301, a CPU 302, an output interface 303, a ROM 304, and a RAM 305. The input interface (IF) 301 receives image data and a control signal for driving the print head 201 from, for example, an image processing apparatus outside the printer 114. The input interface 301 transmits the received image data and control signal to the RAM 305 and the CPU 302. The CPU 302 executes a control program stored in the ROM 304 which is a non-volatile memory to perform signal processing for the image data. The image data subjected to the signal processing is output as print data from the output interface 303 together with the control signal. The print head 201 is driven by the output print data and control signal and an image is printed on the print medium 204.

<System Configuration>

Figure 4:
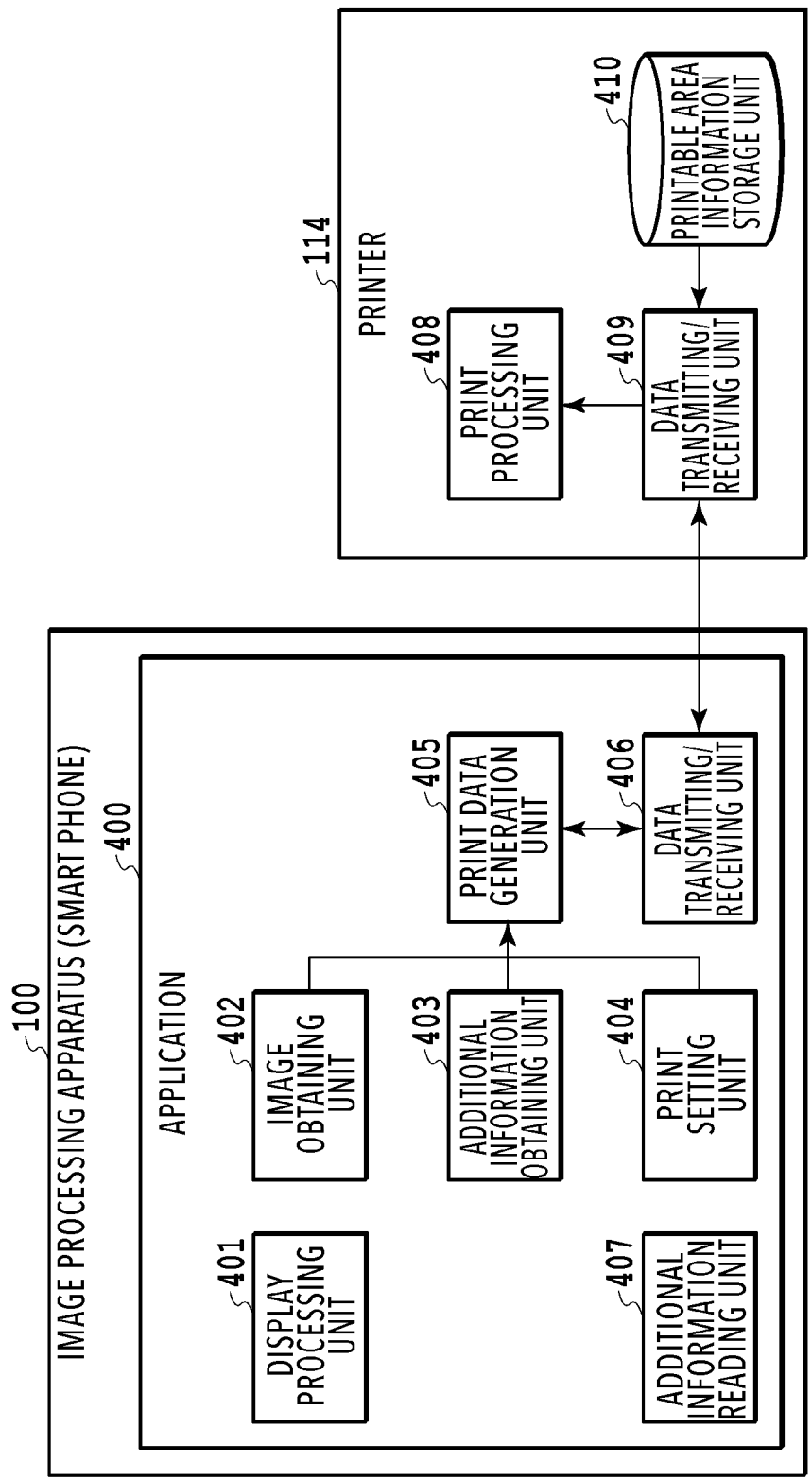
FIG. 4 is a block diagram illustrating an example of the configuration of the system.

FIG. 4 is a diagram illustrating an example of the configuration of the image processing system including an application 400 operated in the image processing apparatus 100 and the printer 114. The application 400 includes a display processing unit 401, an image obtaining unit 402, an additional information obtaining unit 403, a print setting unit 404, a print data generation unit 405, a data transmitting/receiving unit 406, and an additional information reading unit 407. The application 400 may include units other than the above-mentioned units. The application 400 is stored as a program in the ROM 103 or the secondary storage device 105 illustrated in FIG. 1 and is implemented by the execution of the program by the CPU 102. That is, the CPU 102 executes the program stored in the ROM 103 or the secondary storage device 105 to function as each unit of the application 400. The application 400 has a function of generating image data in which additional information has been embedded on the basis of the image data to be printed and the input additional information. The application 400 has a function of transmitting print data for printing the generated image data to the printer 114.

The printer 114 includes a printing processing unit 408, a data transmitting/receiving unit 409, and a printable area information storage unit 410. The CPU 302 executes the program stored in the ROM 304 to implement the printing processing unit 408 and the data transmitting/receiving unit 409. The printable area information storage unit 410 is implemented by the ROM 304 or the RAM 305.

Figure 5:
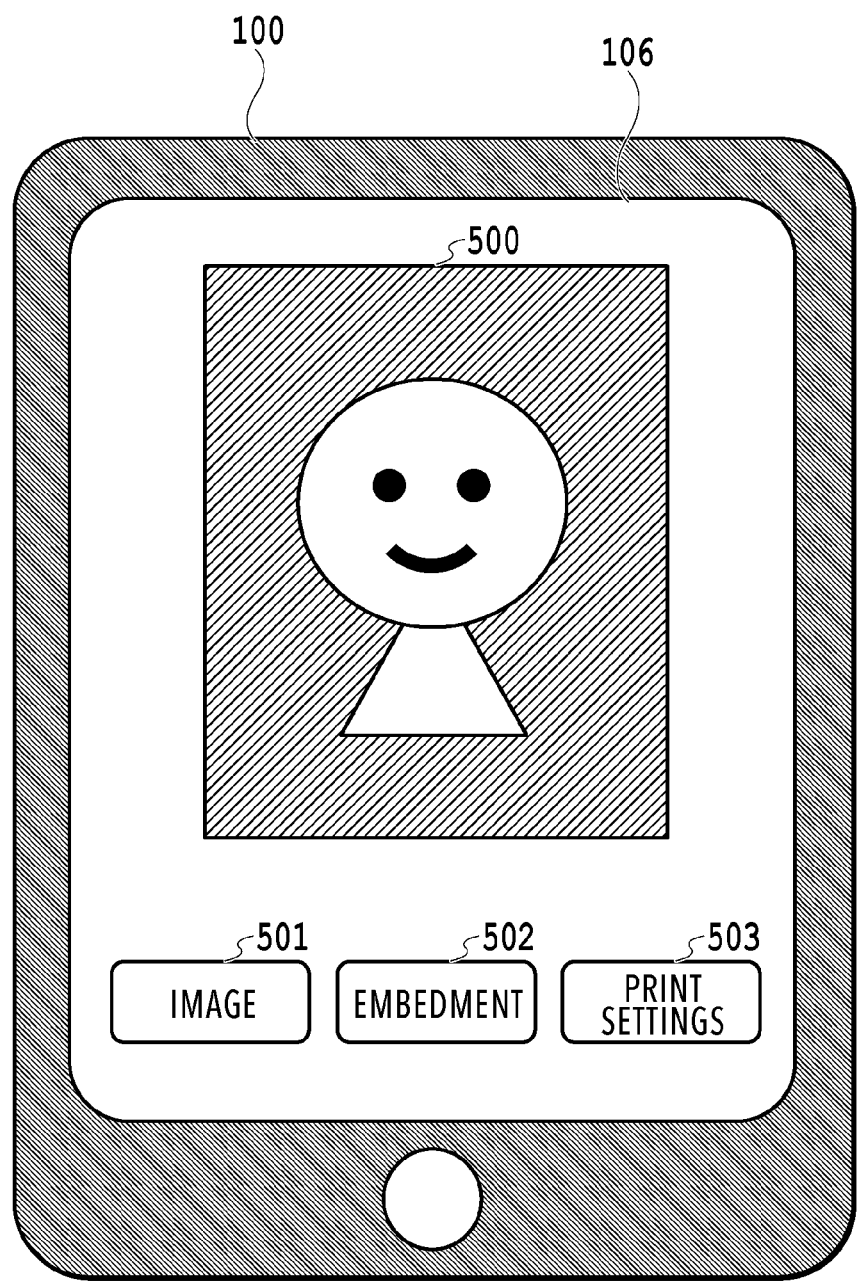
FIG. 5 is a diagram illustrating an example of the configuration of a screen of an application.

FIG. 5 is a diagram illustrating an example of a screen of the application 400 operated in the image processing apparatus 100. Next, the process performed by each block illustrated in FIG. 4 will be described with reference to an example of the screen illustrated in FIG. 5.

The display processing unit 401 performs a process of displaying, for example, character information that is embedded as the additional information and an image used for a printing process on the display 106 of the image processing apparatus 100. The display processing unit 401 also has a function of displaying information related to a user interface (UI), such as a button for selecting an image and characters and a print setting list.

In FIG. 5, an image selection button 501, an embedment information setting button 502, and a print setting button 503 are displayed on the display 106 of the image processing apparatus 100. Content (image) that is being edited is displayed in a content editing area 500.

The image obtaining unit 402 obtains an image in which the additional information is to be embedded. For example, in a case where the image selection button 501 illustrated in FIG. 5 is selected, an image selection dialogue appears such that the user can select an image which can be used in the image processing apparatus 100. In the present embodiment, an image is selected from the image selection dialogue. However, the internal imaging device 112 may be operated to capture an image and the captured image may be used. The image obtained by the image obtaining unit 402 is displayed in the content editing area 500 and can be enlarged, reduced, rotated, or moved by a touch operation, a swipe operation, or a pinch operation. In addition, any editing may be performed.

Figure 6:
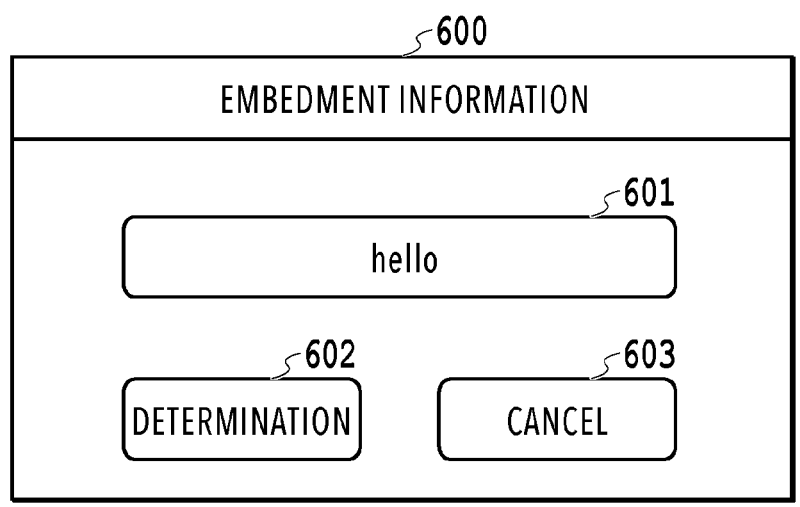
FIG. 6 is a diagram illustrating an example of an embedment information input dialogue of the application.

FIG. 6 is a diagram illustrating an example of an embedment information setting dialogue 600. In a case where the embedment information setting button 502 illustrated in FIG. 5 is selected, the embedment information setting dialogue 600 illustrated in FIG. 6 is displayed on the display 106. The additional information obtaining unit 403 obtains, for example, information edited through the embedment information setting dialogue 600 illustrated in FIG. 6 as the additional information. In a case where the user taps an area 601 illustrated in FIG. 6, the user can edit the information (additional information) desired to be embedded. For example, it is assumed that a character string "hello" is embedded as the additional information. In the present embodiment, the input of text is given as an example. However, all information items related to an image, such as a copyright, an imaging date and time, an imaging place, and a photographer, may be embedded as the additional information. Information related to a link destination, such as a uniform resource locator (URL), may be embedded as the additional information. Information other than the text, such as a sound or a moving image, may be embedded as the additional information. In a case where there is a common data table, identification information for identifying data in the data table may be embedded as the additional information. In a case where the input of the additional information ends, the user presses a determination button 602. In a case where the input of the additional information is cancelled, the user presses a cancel button 603. As described in FIG. 6, the user may consciously input the additional information desired to be embedded or the application 400 may input the additional information without the user's awareness.

Figure 7:
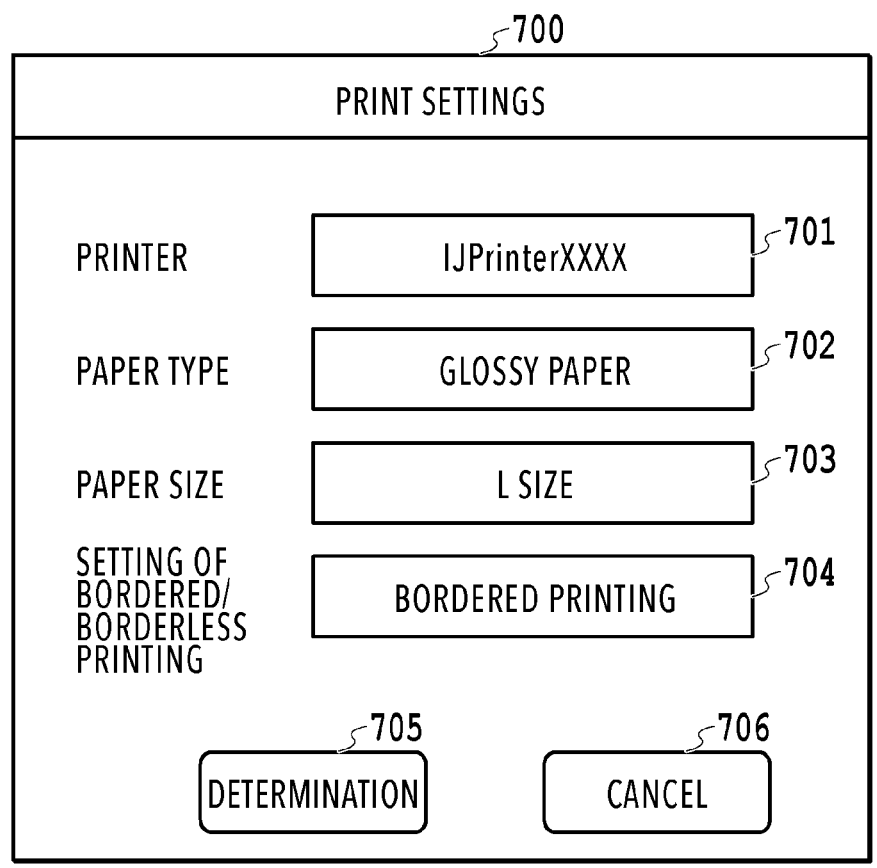
FIG. 7 is a diagram illustrating an example of a print setting dialogue of the application.

FIG. 7 is a diagram illustrating an example of a print setting dialogue 700. In a case where the print setting button 503 illustrated in FIG. 5 is selected, the print setting dialogue 700 illustrated in FIG. 7 is displayed on the display 106. The user performs the selection of a printer, the selection of a paper type, the selection of a paper size, and the setting of bordered/borderless printing through the print setting dialogue 700. In a case where a printer selection list 701 is tapped, a list of available printers is displayed and the user can select any printer. Similarly, in a case where a paper type list 702 is tapped, a list of available paper types is displayed and the user can select any paper type. Examples of the paper type include glossy paper, matte paper, and plain paper. In a case where a paper size selection list 703 is tapped, a list of available paper sizes in the paper type selected by the paper type list 702 is displayed and the user can select any paper size. In print border setting 704, border setting (bordered/borderless printing) at the printing is performed. Bordered printing means a printing method which performs printing such that margins are provided on four sides of a printed material and borderless printing means a printing method which performs printing such that there is no margin in paper.

In a case where a print button 705 is pressed, the print setting unit 404 transmits print settings to the print data generation unit 405 and the printer proceeds to a printing process. In a case where a cancel button 706 is pressed, the printer returns to the previous screen without performing printing.

Information relates to the print settings of the printer displayed in the print setting dialogue 700 illustrated in FIG. 7 may be stored in the information processing apparatus in advance or may be appropriately downloaded from the server 116 or the printer 114 through the network.

The print data generation unit 405 performs a content rendering process, an additional information embedment process, and a process of generating data required for printing in the printer 114. In the rendering process, image data used for printing is generated from the content which has been obtained by the image obtaining unit 402 and then displayed in the content editing area 500 illustrated in FIG. 5. In the additional information embedment process, the additional information obtained by the additional information obtaining unit 403 is embedded in the image data generated by the rendering process.

In the present embodiment, the content used to generate print data is described by a web standard language (for example, Hyper Text Markup Language (HTML), CSS, or JavaScript (registered trademark)). In the present embodiment, an example in which the content used for printing is described by Scalable Vector Graphics (SVG) that is one of the graphic notation methods in HTML will be described.

However, the present embodiment is not limited thereto. For example, Canvas used to describe graphics in HTML may be used.

FIGS. 8A and 8B are diagrams illustrating an example in which the content used for printing is described in the present embodiment. In the present embodiment, content in which only one image is disposed will be described as an example. FIG. 8A illustrates an example of the description of the SVG in this case. The example of the description of the SVG illustrated in FIG. 8A is given in order to describe the outline and the detailed description of settings will be omitted. In FIGS. 8A and 8B, a number at the left end indicates the number of rows.

In FIG. 8A, a first row shows that content is described by the SVG and indicates the size of the SVG A second row indicates the description of the image added to the content. In the present embodiment, the application 400 creates the content of only one image. However, text or a stamp may be added to the content. In this case, the information of the added text or stamp is described by the SVG Next, a process until the print data generation unit 405 performs an SVG content rendering process and an additional information embedment process (also referred to as a multiplexing process) to generate print data will be described in detail with reference to FIG. 9.

Figure 9:
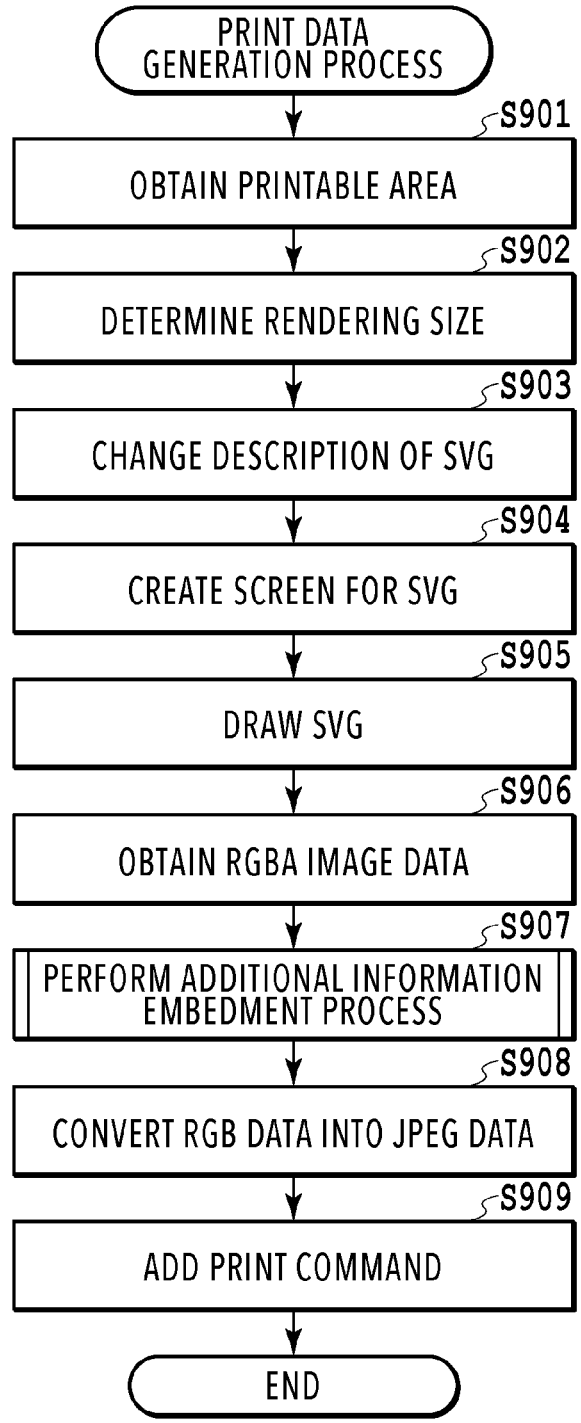
FIG. 9 is a flowchart illustrating a print data generation process.

FIG. 9 is a flowchart illustrating an example of the print data generation process performed by the print data generation unit 405.

In Step S901, first, the print data generation unit 405 obtains printable area information. The printable area information (referred to as area information in some cases) is information for defining a printable area of a print medium (for example, paper or a disk medium) used for printing.

FIG. 10 is a diagram illustrating an example of the printable area information. For example, the printable area information illustrated in FIG. 10 is stored in the printable area information storage unit 410 of the printer 114 to be used. As illustrated in FIG. 10, in printable area information 1000, a printable area of a print medium is indicated by the number of pixels in a case where printing is performed at a predetermined resolution (300 dpi in FIG. 10) under predetermined print settings. As illustrated in FIG. 10, the printable area information varies depending on the print settings. The printable area information has the pixel values of a width (W) and a height (H) and the pixel value of a margin for each of bordered printing and borderless printing. In the example illustrated in FIG. 10, information in a case where printing is performed at 300 dpi is described. The margin indicates the margin size of a border portion and a minus sign in the borderless printing means that the edge of the image is cropped. Here, in a case where the bordered printing is set, a "print image size" illustrated in FIG. 10 is the printable area. In contrast, in a case where the borderless printing is set, a "paper size" illustrated in FIG. 10 is the printable area. The printable area information will be described in detail below.

The printable area information illustrated in FIG. 10 is transmitted in a format in which it can be transmitted from the printer 114 to the image processing apparatus 100 through the data transmitting/receiving units 406 and 409. In the present embodiment, the example in which the printable area information is stored in the printable area information storage unit 410 of the printer 114 and the stored information is transmitted to the image processing apparatus 100 has been described. However, the present embodiment is not limited thereto. The printable area information may be held in the application 400 in advance. The printable area information may be downloaded by the application 400 from the server 116 through the Internet 115. In addition, the printable area may vary depending on the type of printer. That is, even in a case where the print settings and the print media are the same, the printable areas of the print media may be different. In this case, the application 400 may obtain the printable area information using the following method. The application 400 may store the printable area information for each type of printer in advance. Then, the application 400 may obtain corresponding printable area information on the basis of the information of the printer used for printing. That is, the application 400 may obtain printable area information corresponding to the type of printer selected by the user from the printer selection list 701 of the print setting dialogue 700.

Then, in Step S902, the print data generation unit 405 determines a rendering size (a "print image size" in FIG. 10) from the printable area information corresponding to the paper settings. In a case where the paper settings are an L size and bordered printing and the print resolution is 300 dpi, the rendering size is 950 px (pixels)×1400 px as illustrated in FIG. 10. In a case where a print resolution of 300 dpi or more can be set as the print settings, printable area information corresponding to other print resolutions is stored in the printable area information storage unit 410. In Step S902, a printable area corresponding to the print resolution is referred. Alternatively, in a case where a print resolution other than 300 dpi is set as the print settings, rendering sizes corresponding to the print resolutions other than 300 dpi may be calculated from the printable area information illustrated in FIG. 10. For example, in a case where the paper settings are an L size and bordered printing as described above and the print resolution is 600 dpi, a rendering size of 1900 px×2800 px is calculated with reference to the printable area information illustrated in FIG. 10. In Step S903, the print data generation unit 405 rewrites a portion of the SVG which is content for printing. Here, the horizontal width and the vertical width of the SVG are changed to the image size to be transmitted to the printer so as to be fitted to the rendering size determined in Step S902. Specifically, the width and the height in the second and third rows of the SVG illustrated in FIG. 8A are changed to "950" and "1400", respectively, and viewBox in the second row is changed to "0 0 950 1400". FIG. 8B illustrates an example of the rewritten SVG Then, in Step S904, the print data generation unit 405 requests an operating system (OS) (not illustrated) of the image processing apparatus 100 to generate a screen. Here, the information of an area with a size of 950 px×1400 px is obtained with reference to the SVG rewritten in Step S903. Then, the OS generates a screen for SVG (950 px×1400 px). The information of the size of the SVG may not be stored in the SVG but may be stored in the application. In addition, the screen generated by the OS is generated as an off-screen. The off-screen is a screen that is not displayed on the UI.

In Step S905, the print data generation unit 405 requests the OS to draw the SVG on the screen generated in Step S904. The OS loads the information of the SVG. The application 400 receives a notification indicating the completion of the loading from the OS at the time when the information of the SVG is loaded. A standard function of the OS may be used for the notification. For example, in the case of an Objective-C language that is used to create iOS applications, for example, a web ViewDidFinishLoad function corresponds to the load completion notification. In addition, in the case of a Java language that is used to create Android applications, for example, an onPageFinished function corresponds to the load completion notification. In a case where the load completion notification is received, the application 400 determines that the drawing of the SVG has been completed and proceeds to the next step.

In Step S906, the print data generation unit 405 requests the OS to transmit image data of the content. Here, the image data is RGBA data of the content displayed on the off-screen. Simply put, screen capture is performed. The OS captures the off-screen on which the content is drawn and transmits the obtained RGBA data to the application 400, in response to the request from the application 400.

In Step S907, the print data generation unit 405 performs a process of embedding the additional information in the obtained RGBA data. The additional information is embedded in the image so as not to be visually recognized. In the additional information embedment process, the additional information obtained by the additional information obtaining unit 403 and the printable area information 1000 obtained in Step S901 are used, which will be described in detail below. In Step S906, the information of A (transmittance) is included in the RGBA data obtained from the OS. In the present embodiment, since the information of the transmittance is not used for printing, a process of removing the information of the transmittance and embedding the additional information as RGB data is performed.

In Step S908, the print data generation unit 405 converts the RGB data subjected to the additional information embedment process into JPEG image data. In the present embodiment, the example in which the image data is converted into JPEG image data has been described. However, the image data may be data converted into the Portable Document Format (PDF) by a known PDF technique.

In Step S909, the print data generation unit 405 adds a print command to be transmitted to the printer 114 to the JPEG image data generated in Step S908. Here, the data added to the JPEG image data is generated on the basis of the information of the print settings. In addition, a command to control the printer 114 may be added.

FIG. 11 is a diagram illustrating an example of a print data print command. Here, a command described in an XML format is used as the print command. In FIG. 11, for example, a printer setting indicating that "data is printed on glossy paper with an L size in a standard mode" is described in the third to fifth rows. In addition, print data which is "JPEG data with a horizontal width of 950 and a vertical width of 1400" is described in the seventh to ninth rows and the JPEG data converted in Step S909 is inserted into the tenth row.

The printer 114 receives the image data (JPEG data) and the print command and performs printing. The rendering process, the additional information embedment process, and the print data generation process performed by the print data generation unit 405 are ended by the above-mentioned steps.

The description returns to FIG. 4. The data transmitting/receiving unit 406 of the image processing apparatus 100 transmits the print data to the printer 114. The application 400 requests the OS to transmit the print data and the OS transmits the data received from the application to the printer 114. The data is transmitted by, for example, a known wireless WiFi technique that connects the image processing apparatus 100 and the printer 114 using radio waves. For a method for transmitting the data, other known methods may be used. For example, the image processing apparatus 100 and the printer are connected to each other by a USB port. In the image processing apparatus 100, a printer driver converts the data into raster data that can be printed by the printer. The raster data that can be printed may be transmitted to the printer by a USB port. The printer may convert the received raster data into data that can be printed and perform printing.

Next, the process of the printer 114 will be described. In the printer 114, the data transmitting/receiving unit 409 receives the print data transmitted from the image processing apparatus 100. The data transmitting/receiving unit 409 analyzes the print command included in the received print data and transmits the analyzed print setting information, such as a paper size and the type of paper, to the printing processing unit 408. In addition, the data transmitting/receiving unit 409 decodes the JPEG file included in the print data, converts the decoded file into image data, and transmits the converted image data to the printing processing unit 408. Here, in a case where correction process information is included in the print setting information in normal printing, an image correction process may be performed for the image data. Examples of the image correction process include brightness adjustment, contrast adjustment, color balance adjustment, and backlight correction or red-eye correction on the assumption that a photograph is printed. However, in a case where an image in which additional information has been embedded is printed, it is assumed that the image correction process is not performed since there is a concern that the embedded information will be lost or signal intensity will be reduced by image processing. In a case where the above-mentioned image correction process is performed, it is preferable that the image correction process is performed before the application 400 generates print data (that is, before additional information is embedded).

The printing processing unit 408 performs color separation for the image data received from the data transmitting/receiving unit 409 such that preferred colors are obtained in a case where the image data is output by the printer and converts the image data into ink color data. As a method for converting the image data into ink color data, any method may be used as long as a known color conversion process of converting an image format (RGB) used to display a screen into ink colors for printing (CMYK) can be performed.

For example, four colors, that is, cyan (C), magenta (M), yellow (Y), and black (K) are assumed as the ink colors of the printer 114. The printing processing unit 408 converts the input data including three colors, that is, red (R), green (G), and blue (B) into ink color data including four colors, that is, C, M, Y, and K. In a case where the conversion is performed, a color separation table is used. In a case where the values of R, and B are input, the color separation table is a three-dimensional look-up table that can convert the input values into the values of C, M, Y, and K ink colors. The printing processing unit 408 converts the values of R, G and B into the values of C, M, Y, and K ink colors for each pixel of the input image data, using the color separation table.

In addition, the printing processing unit 408 performs image processing, such as output gradation correction or halftoning, using image processing parameters, such as a look-up table, to convert ink color data into print-out data.

The converted print-out data is transmitted to the control circuit unit 203 illustrated in FIG. 2. The control circuit unit 203 discharges ink to the print medium 204 on the basis of the print-out data to form an image. The additional information is embedded in the formed printed material. The print data printing process is ended by the above-mentioned steps.

The additional information reading unit 407 of the application 400 has a function of performing a process for reading and extracting the additional information from the printed material in which the additional information has been embedded. The additional information extraction process will be described in detail below. In the example illustrated in FIG. 4, the application 400 performs both the embedment and the reading of the additional information. However, the embedment and the reading of the additional information may be performed by different applications.

<Additional Information Embedment Process>

Figure 12:
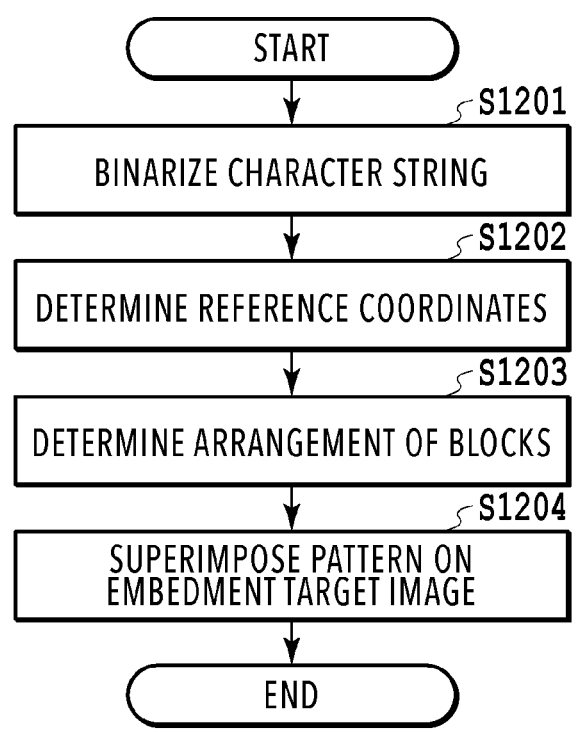
FIG. 12 is a flowchart illustrating an additional information embedment process.

Next, the process of embedding additional information in the rendered image data which is performed by the application 400 will be described. FIG. 12 is a flowchart illustrating the additional information embedment process and is a diagram illustrating Step S907 of FIG. 9 in detail. The process illustrated in FIG. 12 is performed by the print data generation unit 405 of the application.

In Step S1201, the print data generation unit 405 converts the additional information into binary data. Here, a case in which a character string "hello" is input as the additional information will be described as an example. The binary data is information represented by "0" or "1" and a sequence of the binary data has a specific meaning. The correspondence between the binary data and a character is defined by a so-called "character code". For example, "shift JIS" which is one of the character codes is given as an example. In this case, "h" corresponds to binary data "01101000". Similarly, "e" corresponds to binary data "01100101", "l" corresponds to binary data "01101100", and "o" corresponds to binary data "01101111".

That is, the characters "hello" can be represented by binary data "0110100001100101011011000110110001101111". Conversely, in a case where the binary data "0110100001100101011011000110110001101111" can be obtained, the characters "hello" can be obtained. That is, data is embedded such that it can be determined by "0" or "1" to achieve the embedment of the additional information.

Figure 13A:
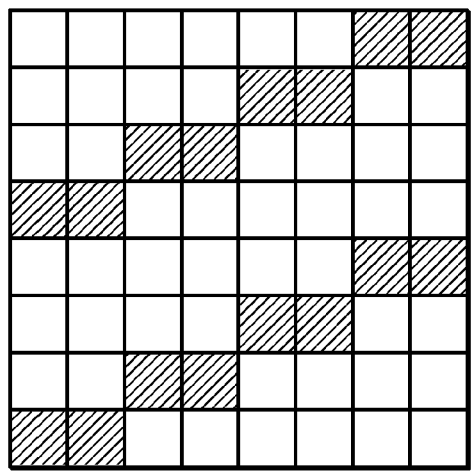
FIGS. 13A to 13D are diagrams illustrating embedment patterns.
Figure 13B:
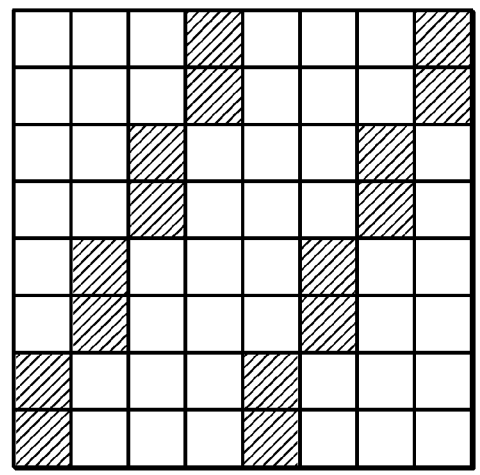

FIGS. 13A to 13D are diagrams illustrating a method for embedding information of "0" or "1" in an image. Here, two patterns illustrated in FIGS. 13A and 13B are considered in order to generate "0" and "1". For example, it is assumed that the pattern illustrated in FIG. 13A indicates "0" and the pattern illustrated in FIG. 13B indicates "1". Each of the patterns illustrated in FIGS. 13A and 13B has a size of 8 px×8 px. In each pattern, one rectangle indicates 1 px. The print data generation unit 405 embeds the additional data that is formed by binary data represented by "0" and "1" in the image according to the patterns. In this way, it is possible to give a cyclic pattern to an area with a size of 8 px×8 px in the image.

Figure 13C:
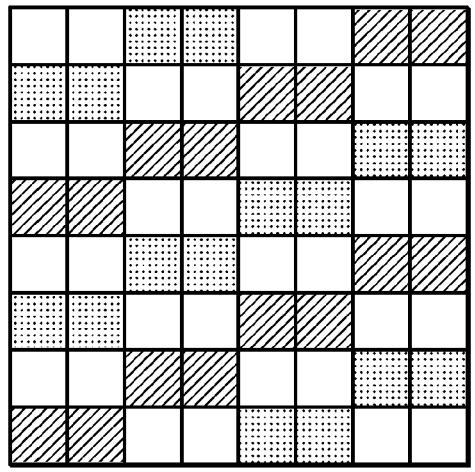
Figure 13D:
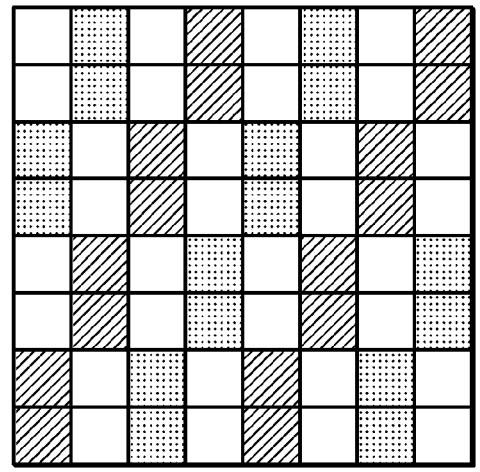

For example, a method that directly superimposes periodicity on R, G, and B values (brightness information) is considered as a method for embedding a pattern in an image. For example, another method which separates R, G, and B values into other color space information (for example, CIE L*a*b* or YCrCb signals), such as brightness-color difference information, and superimposes periodicity may be used to embed the pattern. Alternatively, a method which separates R, G and B values into ink colors (for example, CMYK signals) and superimposes periodicity may be used to embed the pattern. In the present embodiment, for simplicity, a method which superimposes periodicity on a B component among R, G, and B components is given as an example. In FIGS. 13A and 13B, as the value of the B component, 30 is subtracted from a hatched pixel (px). Preferably, there is a pixel to which the value of the B component is added in addition to the pixel from which the value of the B component is subtracted. The pattern in which the added value and the subtracted value are equal to each other makes it possible to reduce discomfort after the additional information is embedded in the image. FIGS. 13C and 13D illustrate patterns including subtraction and addition. A thin hatched portion is an added portion. As such, the value of a predetermined component among R, G, and B data items of the image in which the additional information is to be embedded is added according to a predetermined pattern to embed the additional information.

Figure 14:
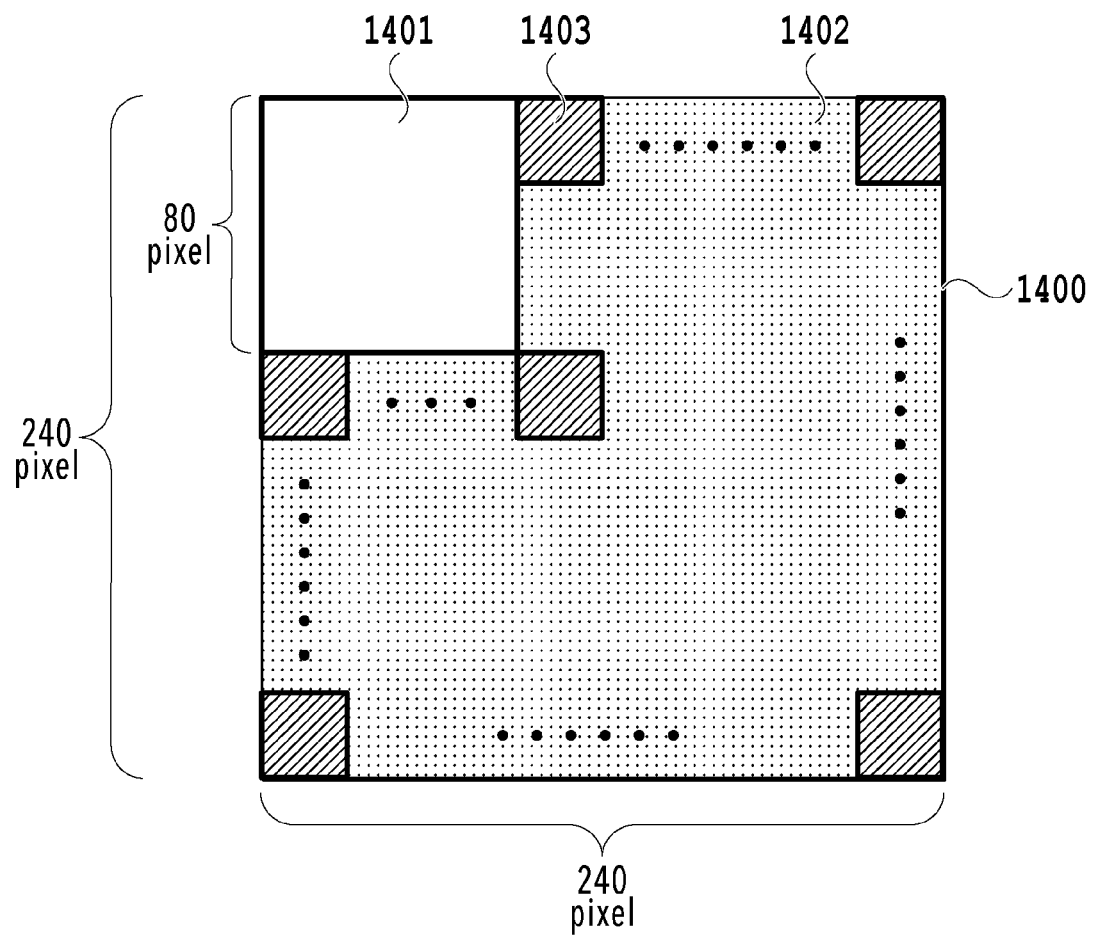
FIG. 14 is a diagram illustrating an example of the configuration of a unit block.

FIG. 14 is a diagram illustrating a unit block (multiplexing block) of the additional information used in the present embodiment. A block 1400 indicates one unit block and all information of the unit block is read to extract the embedded additional information. The unit block 1400 includes a marker part 1401 and a data part 1402. The marker part 1401 is a block which has a size of 80 pixels×80 pixels and is used to specify the position of the unit block 1400 in a case where the additional information is read. In the marker part 1401, information indicating the marker part is embedded. As the information indicating the marker part 1401, for example, a specific pattern which is a combination of the patterns illustrated in FIGS. 13A and 13B is added. In a case where the pattern is read, the pattern is detected to detect the marker part 1401. As another method, it is considered that the marker part 1401 is formed in a pattern that has periodicity or a periodic direction different from those illustrated in FIGS. 13A and 13B.

The data part 1402 includes patterns 1403 (that is, patterns indicating "0" or "1") illustrated in FIG. 13A or FIG. 13B. In the present embodiment, the unit block 1400 has a size of 240 pixels×240 pixels and the data part 1402 includes 800 patterns 1403. Since one pattern 1403 indicates 1-bit information, the entire block 1400 has 800-bit information.

In the present embodiment, the marker part 1401 in the unit block is disposed at the upper left corner of the block 1400. However, the marker part 1401 may be disposed at the other positions. For example, the marker part 1401 may be disposed at the upper right corner or at the center of the block 1400. In addition, the marker part 1401 may have shapes other than the rectangle or may be dispersively disposed in the unit block.

Figure 15B:
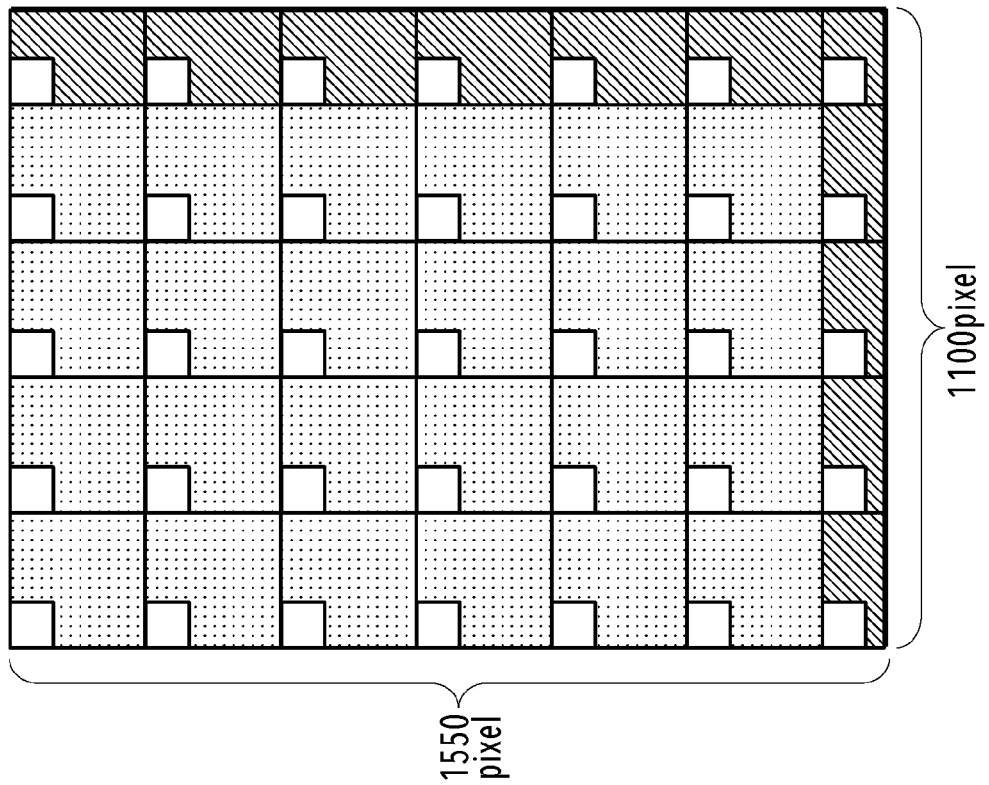
FIGS. 15A and 15B are diagrams illustrating an example of the embedment of the unit block in a printed material.
Figure 15A:
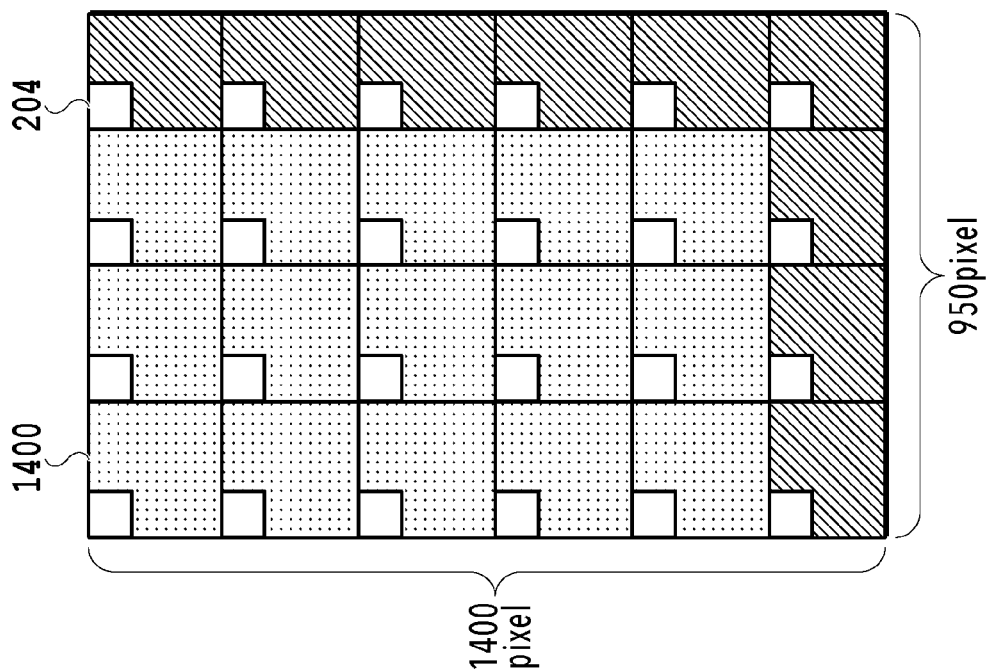

FIG. 15A is a diagram illustrating an aspect in which the unit blocks 1400 are repeatedly embedded in a print medium 204. That is, FIG. 15A illustrates an aspect in which the unit blocks 1400 each indicating the same additional information are repeatedly embedded in the entire surface of the print medium 204. It is assumed that the print settings illustrated in FIG. 15A are an L size, a print resolution of 300 dpi, and bordered printing. In this case, the print image size is a horizontal width of 950 px and a vertical width of 1400 px by the process in S902 with reference to FIG. 10. Since the print image size is 950×1400, it is possible to arrange 15 (=3×5) unit blocks with a size of 240 pixels×240 pixels. In order to read the additional information embedded in the print medium 204, it is enough to read a data part of one unit block among a plurality of unit blocks 1400 which are repeatedly embedded. In addition, since a large amount of the same information (the unit blocks 1400) is embedded in the entire surface of the print medium 204, it is possible to increase robustness at the reading. In some cases, even if it is difficult to read the additional information from a certain unit block 1400, it is possible to read the additional information with reference to other unit blocks 1400. Here, a case in which the same information (unit block 1400) is repeatedly embedded has been described as an example. However, the present embodiment is not limited thereto. For example, different kinds of information (blocks with different contents) may be embedded in the entire surface of the image.

In FIG. 15A, an area that has an insufficient block size is provided in a right portion and a lower portion of the print medium. A portion of the block is also embedded in the area.

FIG. 15B illustrates embedment in a case where the print settings are an L size, 300 dpi, and borderless printing. In the borderless printing, rendering is performed in a state in which the print image size is larger than that in bordered printing and printing is performed in a state in which a border portion of the image protrudes from paper. Therefore, since the print image size is larger than that in the bordered printing, 24 (=4×6) unit blocks 1400 that are larger than those in the bordered printing can be arranged.

Here, the relationship among the paper size, the print image size, and the margin included in the printable area information illustrated in FIG. 10 will be described. The paper size indicates the size of paper (print medium) to be printed. The print image size is a value obtained by subtracting the top, bottom, left, and right margins from the paper size. The margin indicates the margin size of the border portion. A minus sign in the borderless printing means that the edge of an image is cropped at the printing. That is, in a case where the print settings are an L size and bordered printing, the width of the print image size is 1050−(50×2)=950 and the height of the print image size is 1500−(50×2)=1400. Similarly, in the case of the borderless printing, the width of the print image size is 1050−(−25×2)= 1100 and the height of the print image size is 1500−(−25× 2)=1550. As illustrated in FIGS. 15A and 15B, the print image size in the borderless printing is larger than that in the bordered printing. In borderless printing, a larger amount of additional information (the information may be the same type or may be different types) than that in the bordered printing can be embedded in a print image.

As such, in the case of the borderless printing, since the print image size is larger than that in the bordered printing, a large amount of additional information can be originally expected to be embedded in the print medium 204. However, in the case of the borderless printing, the edge of the print image is cropped at the printing. Therefore, in some cases, the amount of additional information embedded in the print medium 204 does not increase depending on a method for embedding the additional information. For this reason, in the present embodiment, the position where the additional information is embedded in an image is appropriately determined and then the additional information is embedded. Therefore, it is possible increase the amount of additional information that can be embedded in the image.

The description returns to the flowchart illustrating the additional information embedment process illustrated in FIG. 12. In a case where the binarization of the additional information (character string) ends, the process proceeds to Step S1202. In Step S1202, the print data generation unit 405 determines reference coordinates. The reference coordinates are the coordinates of a position which is a starting point where the additional information is embedded in a print image with a print image size. Specifically, the reference coordinates are the coordinates (X, Y) of a starting point where the unit block 1400 is disposed. The origin of the coordinate system is represented as coordinates of the upper left corner of the print image. The value of X increases from the origin to the right side and the value of Y increases from the origin to the lower side.

In S1202, the coordinates of the upper left corner of a portion which is to be printed in the printable area in the image to be printed is determined as the reference coordinates. As described above, in a case where the print settings are bordered printing, the "print image size" illustrated in FIG. 10 is the printable area. In contrast, in a case where the print settings are borderless printing, the "paper size" illustrated in FIG. 10 is the printable area. FIGS. 15A and 15B illustrate a case in which the reference coordinates are (X, Y)=(0, 0). In a case where the reference coordinates are (0, 0), there is no problem in the bordered printing illustrated in FIG. 15A. However, a problem occurs in the borderless printing illustrated in FIG. 15B.

Figure 16B:
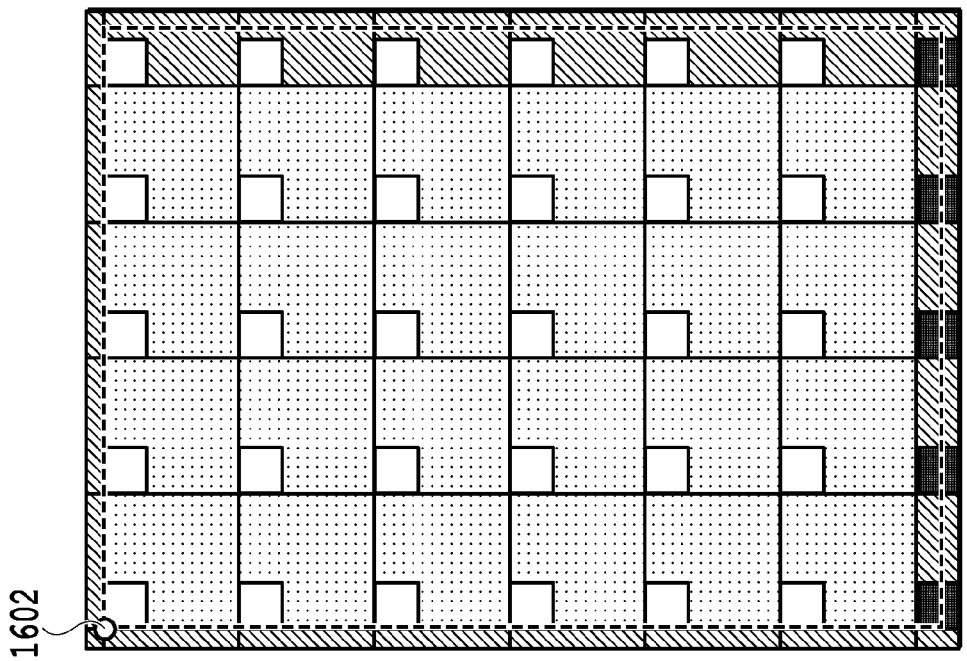
FIGS. 16A and 16B are diagrams illustrating an example of the embedment of the unit block in a printed material at borderless printing.
Figure 16A:
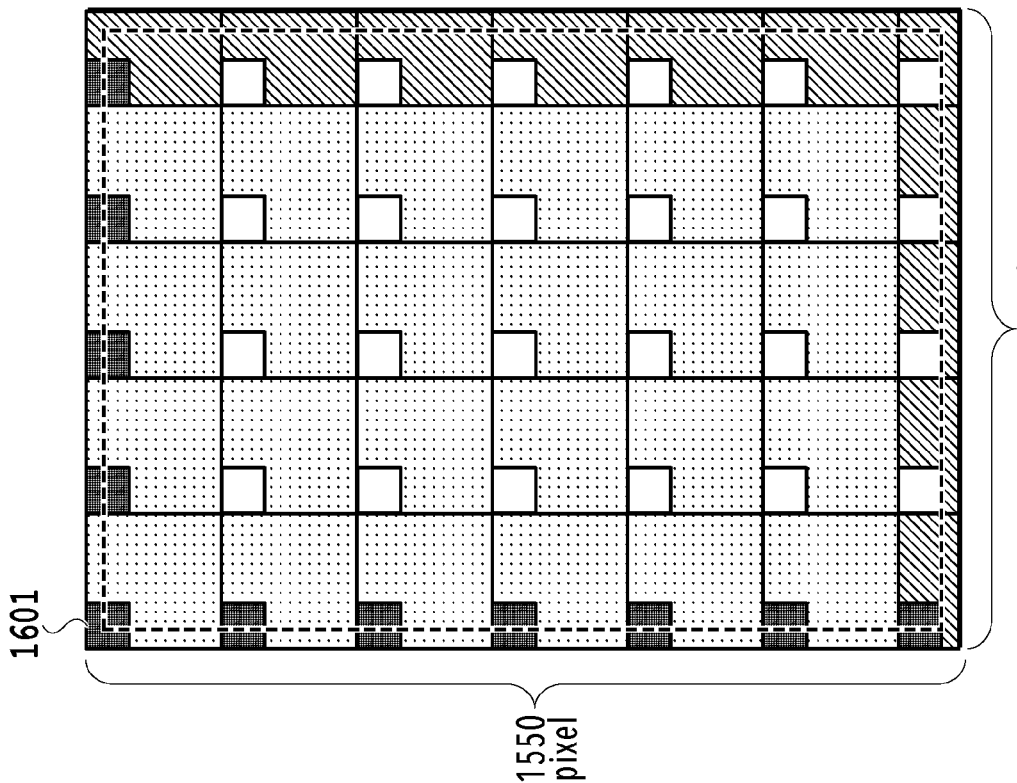

FIG. 16A is a diagram illustrating a printable area at the borderless printing illustrated in FIG. 15B. An area represented by a dotted line in FIG. 16A is a portion which is to be printed in the printable area (here, the entire surface of the print paper) of the print medium 204 in the print image. The size of the area represented by the dotted line is equal to the sum of the print image size and the margin. In the case of the borderless printing, as described above, the margin has a negative value. Therefore, the size of the area represented by the dotted line in FIG. 16A is equal to the sum of the print image size and the negative margin. That is, the size of the area represented by the dotted line is equal to the paper size. In the borderless printing, the edge of the image is cropped at the printing. In a case where an image is printed in the normal mode, there is no problem even if the edge of the image is cropped. However, in a case where the image in which additional information has been embedded is cropped, there is a marker part which is partially lost by the cropping of the edge of the image such as a thick hatched marker part represented by an area 1601 in FIG. 16A. In the block including the lost marker part, it is difficult to detect the marker part at the reading, which makes it difficult to read a data part. Therefore, the number of blocks that can be read is reduced. That is, the amount of additional information that can be read is reduced. As a result, robustness at the reading is reduced.

For this reason, in the present embodiment, in the case of the borderless printing, the reference coordinates are determined so as to minimize the loss of the block (marker part). Therefore, in S1202, 25 obtained by reversing the sign of a margin value (−25) in the borderless printing in the printable area information is used as the XY values of the reference coordinates. That is, (X, Y)=(25, 25) is used as the values of the reference coordinates. In this way, the reference coordinates are determined in Step S1202.

Then, in Step S1203, the print data generation unit 405 determines the arrangement of the unit blocks. The print data generation unit 405 arranges the unit blocks, using the reference coordinates determined in Step S1202 as the starting point. FIG. 16B illustrates an example in which the unit blocks are arranged using reference coordinates 1602 (X, Y)=(25, 25) as the starting point. As can be seen from FIG. 16B, since the blocks are arranged so as to prevent the loss of the marker part, the number of blocks that can be read is larger than that in FIG. 16A. Five marker parts arranged at the lower end are lost by the influence of the shift of the reference coordinates. However, in the blocks including the five marker parts, most of the data parts are originally lost. Therefore, even in a case where the blocks are not capable of being read, the blocks have little effect on the reading of the image data.

In Step S1204, the print data generation unit 405 embeds the additional information in the image, using the determined reference coordinates and the determined arrangement of the blocks. The additional information is embedded by superimposing the patterns illustrated in FIGS. 13A and 13B on each pixel while associating a target image with the arrangement of the blocks illustrated in FIG. 16B. Specifically, since the data part of each block illustrated in FIG.

16B includes the pattern illustrated in FIG. 13A or the pattern illustrated in FIG. 13B, 30 is subtracted from a B component among the R, G, and B components of the pixels corresponding to the hatched portions in each pattern. In a case where the value of the B component is less than 0, the value of the B component is regarded as 0. This is applied to the entire image. In this way, the embedment of the additional information in the image is completed.

The process until the additional information is embedded in the image and the image is printed by the printer has been described above with reference to the block diagrams. Next, a process for reading the printed material having the additional information embedded therein will be described.

<Additional Information Reading Process>

The present embodiment is characterized by the embedment process. Therefore, the reading process is not described in detail and the outline thereof will be described in brief. The additional information reading process is performed by the additional information reading unit 407 of the application 400 illustrated in FIG. 4. However, the additional information may be read by an application of a device different from the device that performs embedment.

Figure 17:
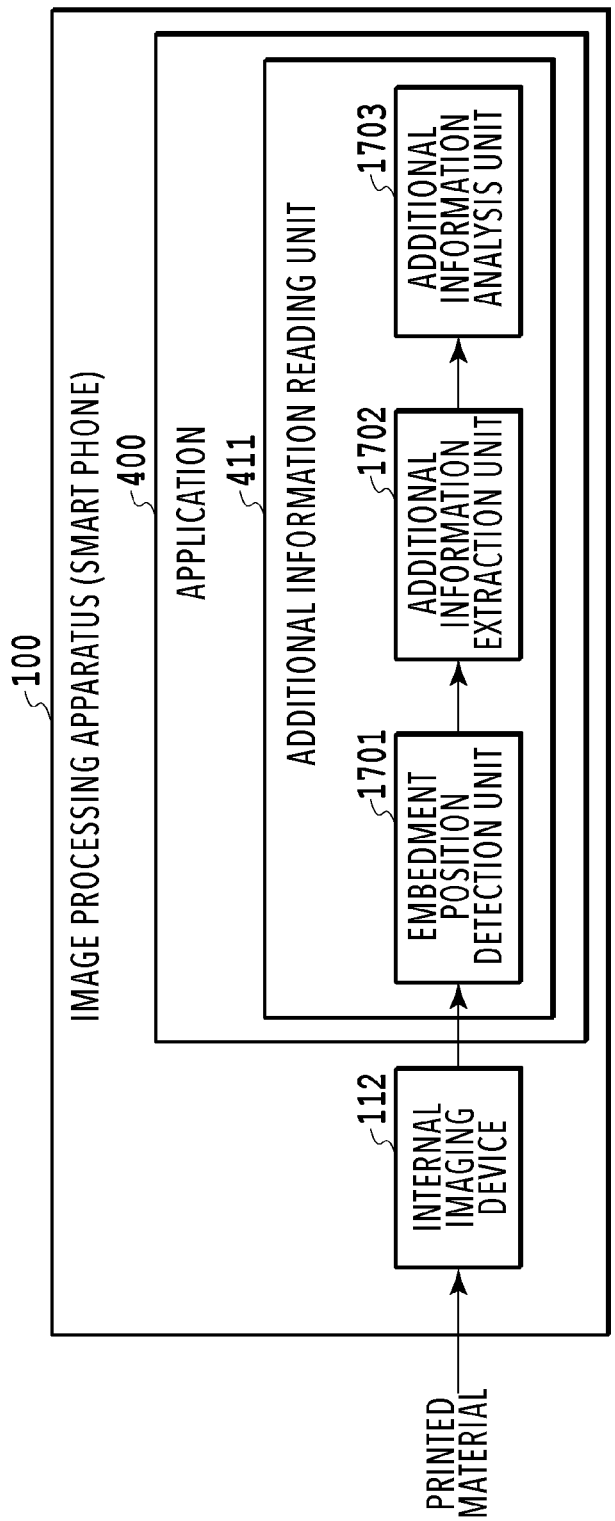
FIG. 17 is a block diagram including an additional information reading processing unit.

FIG. 17 is a block diagram related to the additional information reading process. The additional information reading unit 411 included in the application 400 of the image processing apparatus 100 includes an embedment position detection unit 1701, an additional information extraction unit 1702, and an additional information analysis unit 1703.

First, the application 400 controls the internal imaging device 112 such that an image of the printed material having the additional information embedded therein is captured. The captured image data may be still image data. Alternatively, still image data obtained by extracting each frame from a moving image may be used as the captured image data. The captured image data is transmitted to the embedment position detection unit 1701. It is assumed that the image data is obtained as 8-bit RGB data.

The embedment position detection unit 1701 detects a position where the additional information is embedded from the image data. Specifically, the embedment position detection unit 170 analyzes the spatial frequency characteristics of the image data to detect the embedment position.

Figure 18:
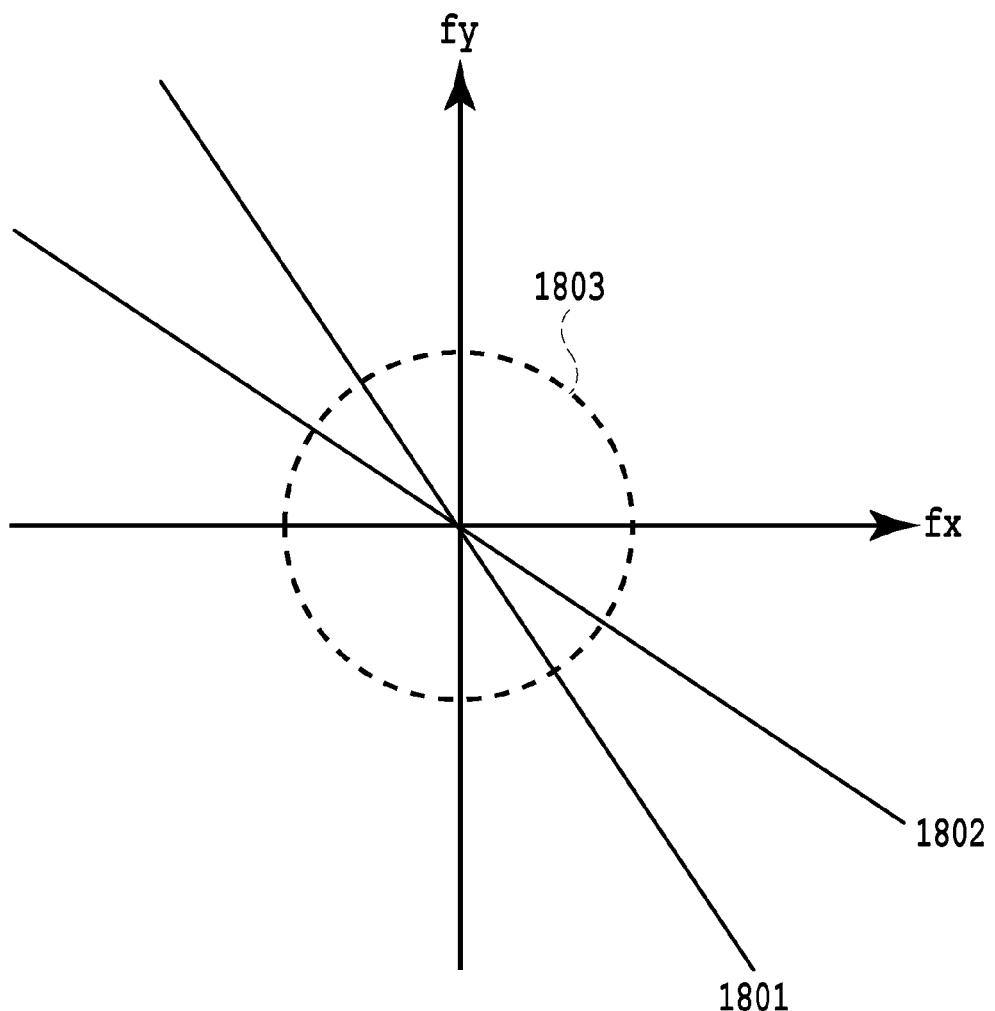
FIG. 18 is a block diagram illustrating the frequency characteristics of the embedment pattern.

FIG. 18 is a diagram illustrating the spatial frequency characteristics of the pattern used for embedment. The horizontal axis indicates a frequency in the horizontal direction and the vertical axis indicates a frequency in the vertical direction. The frequency increases as the distance from the origin increases. In the present embodiment, as illustrated in FIGS. 13A and 13B, two patterns are embedded in the image. In an example of the embedment, 30 is subtracted from the B component among the R, G, and B components. In this way, a large power spectrum is generated in a line 1801 by the pattern illustrated in FIG. 13A. Similarly, a large power spectrum is generated in a line 1802 by the pattern illustrated in FIG. 13B. The embedment position detection unit 1701 detects the power spectrum to extract data "0" or "1". In addition, as a process before the detection, edge detection may be performed to enhance the power spectrum.

In the extraction of data by frequency analysis, it is necessary to accurately cut out an analysis area from the image data. In particular, in a case where an image is captured by a smart phone, since an object distance is not constant, a process is performed which corrects the distance and accurately cuts out the 8×8 patterns illustrated in FIGS. 13A and 13B. For example, in a case where a range 1803 illustrated in FIG. 18 is the frequency of peak appearance by the 8×8 patterns illustrated in FIGS. 13A and 13B, a portion of the captured image is enlarged or reduced and an enlargement and reduction rate at which the peak is the highest in the frequency portion is calculated. In this way, it is possible to correct the object distance. For example, the entire captured image is enlarged or reduced or the resolution of the captured image is changed to correct the object distance. Then, a process for correcting the deviation of a coordinate position is performed. For example, there is a method which repeats the cutout of an area with a size of 8 px×8 px from an image and frequency analysis in the horizontal and vertical directions while shifting the pixels one by one, repeats the process a total of 64 times (8 px in the horizontal direction×8 px in the vertical direction), and uses a position with the highest spectrum intensity as a reference position.

After the detection of the position by the embedment position detection unit 1701 is completed, the additional information extraction unit 1702 extracts (separates) the additional information. In the example illustrated in FIG. 14, in the extraction of the additional information, first, the marker part 1401 of the unit block 1400 including a specific binary pattern is detected and data is read from the data part 1402 on the basis of the position of the marker part 1401. In some cases, at the reading, data only in a portion of the block can be read. In this case, the data of the portion that is not readable may be supplemented with data of other blocks. That is, the additional information may be extracted by extracting data in a first portion of a first block and extracting data in a second portion other than the first portion in a second block different from the first block. In the example illustrated in FIG. 14, in a case where data is completed, a sequence of numbers "0" and "1" corresponding to 800 bits is obtained.

The additional information analysis unit 1703 performs a process that performs data analysis for the sequence of numbers which has been extracted as the additional information by the additional information extraction unit 1702 and converts the sequence of numbers into the format of the embedded additional information. For example, the additional information to be embedded is text document data and a character code is converted into a number by "shift JIS" in advance.

For a 1-byte shift JIS code (one-byte character), conversion corresponding to a number or a character is performed by a combination of upper 4 bits and lower 4 bits. For example, in a case where the upper 4 bits are "0100" and the lower 4 bits are "0001", "A" is determined as the character string. As such, a conversion map is stored in advance and corresponds to a sequence of numbers. Therefore, the sequence of numbers can be converted into a character.

The sequence of numbers extracted as the additional information is temporarily stored in the RAM 104 illustrated in FIG. 1 and a "shift JIS" conversion map stored in the secondary storage device 105 in advance can be referred.

It is assumed that the sequence of numbers extracted as the additional information by the additional information extraction unit 1702 is "0110100001100101-1011000110110001101111". In this case, the sequence of numbers corresponds to the conversion map as follows:

A combination of upper 4 bits "0110" and lower 4 bits "1000" corresponds to a character "h";

A combination of upper 4 bits "0110" and lower 4 bits "0101" corresponds to a character "e";

A combination of upper 4 bits "0110" and lower 4 bits "1100" corresponds to a character "l";

A combination of upper 4 bits "0110" and lower 4 bits "1100" corresponds to a character "l"; and A combination of upper 4 bits "0110" and lower 4 bits "1111" corresponds to a character "o".

Therefore, a character string "hello" is obtained. For example, the extracted character string is displayed on the display by the display processing unit 401 illustrated in FIG. 4. In addition, in a case where the extracted character string is a URL, the display processing unit 401 is connected to a network and displays a screen of a URL destination on the display using a browser. In a case where the URL is a moving image site, a moving image may be displayed on the display and a sound may be output from a speaker (not illustrated). In this way, the additional information reading process ends.

In the present embodiment, the aspect in which the reference position where the additional information is embedded is determined on the basis of the printable area information at the printing has been described. Therefore, it is possible to increase the amount of additional information that can be embedded (read). In addition, the aspect in which the arrangement of the unit blocks is determined on the basis of the reference position determined on the basis of the printable area information. Therefore, it is possible to print an image while reducing the loss of the blocks at the edge of the printable area and to prevent a reduction in robustness at the reading.

In the above-described embodiment, a rendering size corresponding to the print settings is determined in S901 and S902 of FIG. 9. Then, in S1202 of FIG. 12, the reference position where the additional information is embedded in the print image is determined on the basis of the determined rendering size and the print setting indicating whether printing is bordered printing or borderless printing. However, the present embodiment is not limited thereto. For example, a table indicating the reference positions corresponding to all patterns of the combinations of the print settings (combinations of the paper size, bordered printing, and borderless printing) may be stored in the printable area information storage unit 410. In this case, even if the processes in S901 and S902 are not performed, the reference positions corresponding to the combinations of the print settings can be determined with reference to the table in S1202 and the additional information can be embedded in the print image on the basis of an appropriate reference position corresponding to the print settings.

Embodiment 2

In Embodiment 1, the example in which the printable area has a rectangular shape and the borderless printing is performed has been described. In the case of the bordered printing, the marker part is likely to be lost. For example, in a case where additional information is embedded in a printable area with a shape other than the rectangular shape as in disk label printing, it is preferable to appropriately determine the reference position. In the present embodiment, a method for determining the reference coordinates of a printable area with a complicated shape will be described. Since the configuration of the present embodiment is the same as that in Embodiment 1, the description thereof will not be repeated. The present embodiment differs from Embodiment 1 in the reference coordinate determination process in Step S1202 of FIG. 12.

In the present embodiment, a process is performed which determines the reference coordinates such that the loss of the marker part of the unit block is minimized. In other words, the reference coordinates are determined such that the maximum number of marker parts of the unit blocks is included in the printable area. Hereinafter, the process will be described with reference to FIGS. 19A and 19B.

Figure 19A:
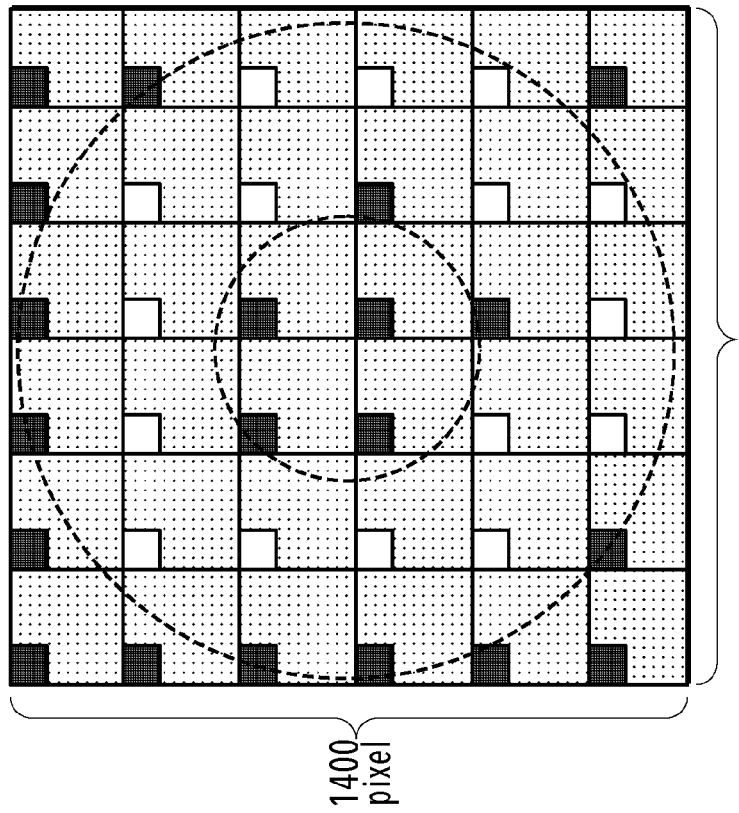
FIGS. 19A and 19B are diagrams illustrating an example of the embedment of the unit block in a printed material.
Figure 19B:
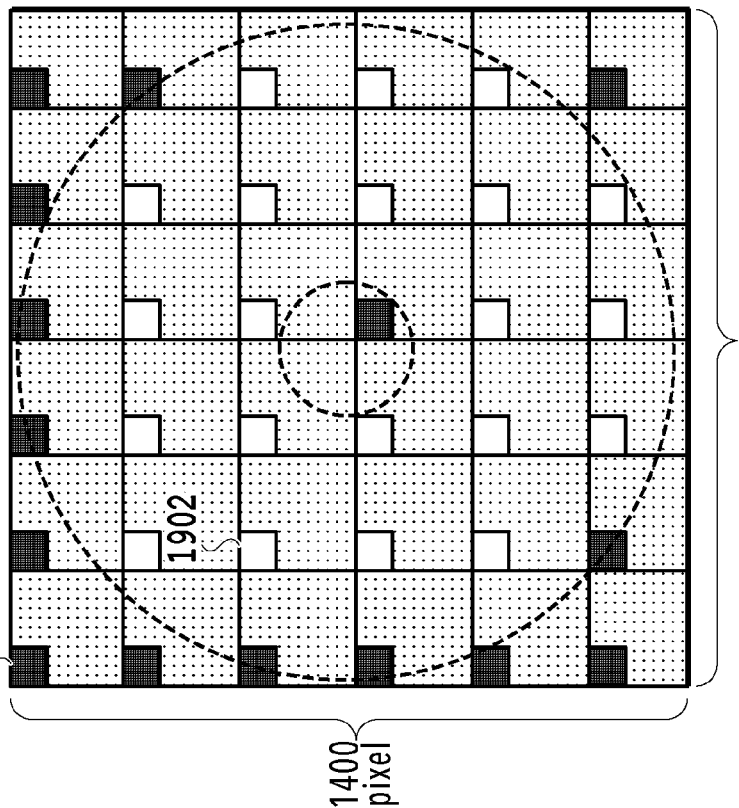

FIG. 19A is a diagram illustrating a printable area of a disk label (with a small inside diameter). FIG. 19B is a diagram illustrating a printable area of a disk label (with a large inside diameter). An area between an outer circle and an inner circle represented by dotted lines is the printable area. Since a thick hatched marker part 1901 is located outside the printable area, it is difficult to read a unit block including the marker part. In contrast, since a white marker part 1902 is located inside the printable area, it is possible to read a unit block including the marker part.

Figure 20:
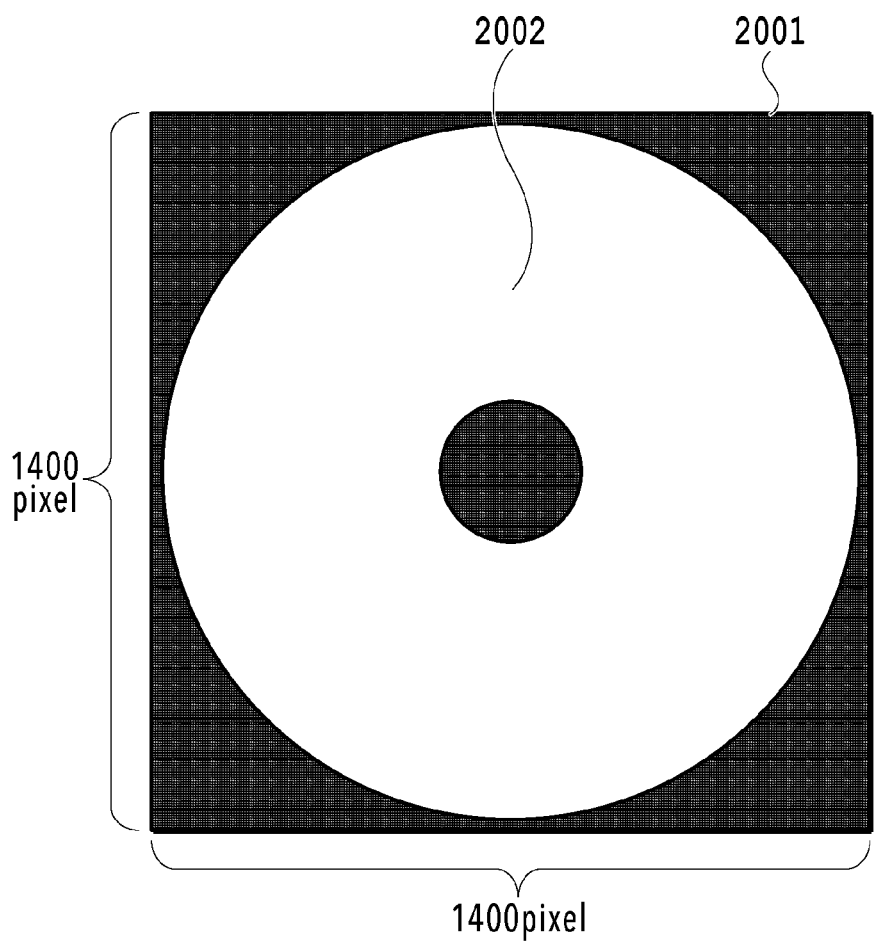
FIG. 20 is a diagram illustrating an example of a mask image in the printable area.
Figure 21:
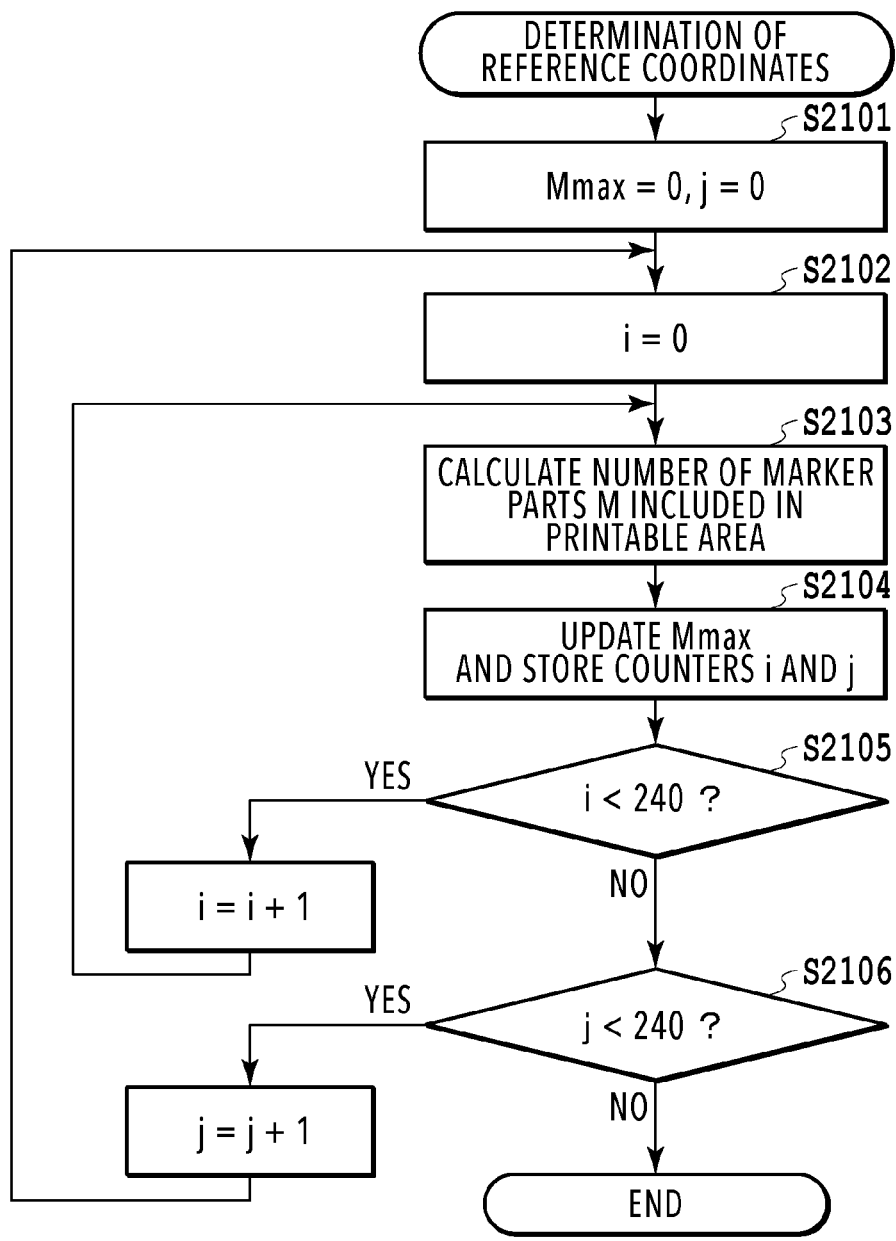
FIG. 21 is a flowchart illustrating a reference coordinate determination process.

In FIG. 19A, 21 white marker parts 1902 are provided. The reference coordinates may be determined such that the number of white marker parts is the maximum. For example, a mask image indicating a printable area illustrated in FIG. 20 may be prepared as printable area information and it may be determined whether a marker part is present in a mask portion 2002. Then, the number of marker parts in the mask portion 2002 may be counted while the reference coordinate position is shifted and the position where the number of marker parts is the maximum may be determined as the reference coordinate position.

FIG. 21 is a diagram illustrating an example of a flowchart illustrating a reference coordinate determination process according to the present embodiment. The process illustrated in FIG. 21 is performed by the print data generation unit 405 of the application 400.

In Step S2101, the print data generation unit 405 initializes the maximum counter value Mmax of the number of marker parts and a horizontal reference coordinate counter i to 0. In Step S2102, similarly, the print data generation unit 405 initializes a vertical reference coordinate counter j to 0.

Figure 22:
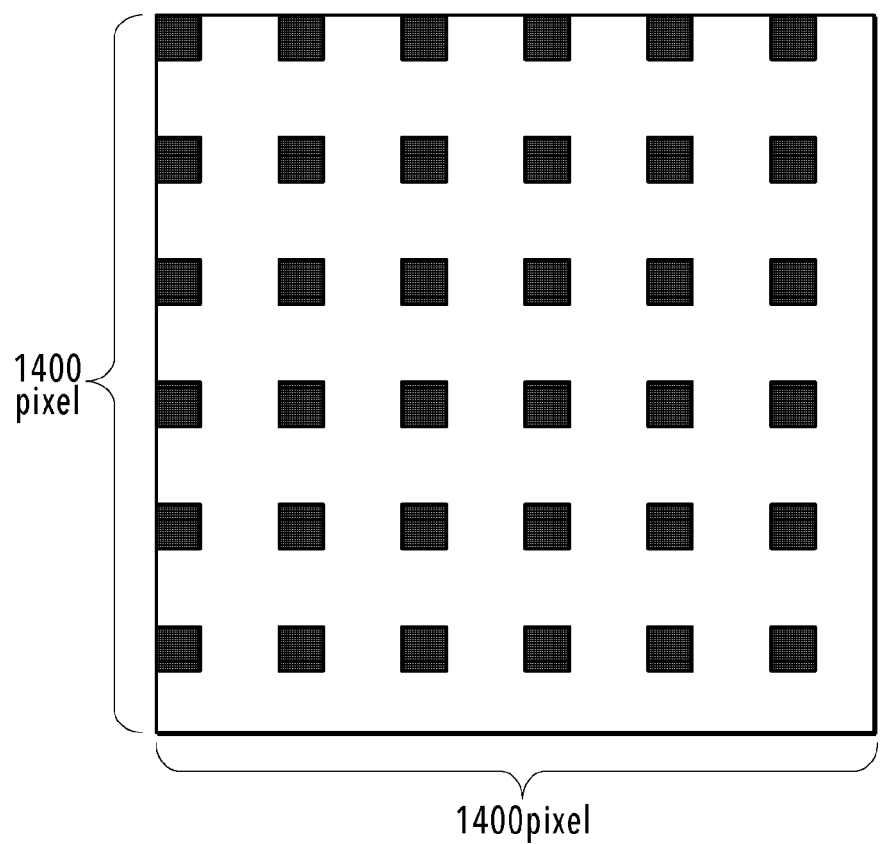
FIG. 22 is a diagram illustrating an example of a block arrangement image.

In Step S2103, the print data generation unit 405 calculates the number of marker parts M included in the printable area. First, the print data generation unit 405 generates a block arrangement image in a state in which the reference coordinates are (0, 0). The block arrangement image is an image illustrated in FIG. 22 in which marker parts with a size of 80 px×80 px are arranged at an interval of 240 px. In FIG. 22, a hatched portion indicates the marker part. The mask image illustrated in FIG. 20 is superimposed on the image illustrated in FIG. 22 and the number of marker parts M all included in the mask portion 2002 is calculated.

In Step S2104, the print data generation unit 405 updates the maximum counter value Mmax. The maximum counter value Mmax is compared with the number of marker parts M calculated in Step S2103. In a case where the number of marker parts M is greater than the maximum counter value Mmax, the number of marker parts M is substituted into the maximum counter value Mmax. At that time, the values of the coordinate counters i and j are stored as Imax and Jmax, respectively.

In Step S2105, in a case where the value of the counter i is less than 240 that is the unit block size, the print data generation unit 405 increments the counter i and returns to Step S2103. Then, in Step S2103, the print data generation unit 405 generates a block arrangement image in a state in which the reference coordinates are (1, 0) and performs the same process as described above. In a case where the value of the counter i is equal to or greater than 240 that is the unit block size, the process proceeds to Step S2106.

In S2106, in a case where the value of the counter j is less than 240 that is the unit block size, the print data generation unit 405 increments the counter j and returns to Step S2102. In a case where the value of the counter j is equal to or greater than 240 that is the unit block size, the process ends.

The reference coordinates (Imax, Jmax) at which the number of marker parts included in the printable area is the maximum can be calculated in the range from the reference coordinates (0, 0) to the coordinates (239, 239) by the above-mentioned process. In the process flow according to the present embodiment, in a case where there are a plurality of reference coordinate points where the number of marker parts is the maximum, a reference coordinate point that appears first is used. However, any reference coordinate point where the number of marker parts is the maximum may be selected.

The method according to the present embodiment can be applied to unit blocks with shapes other than the rectangle. For example, the block may have any shape, such as a circular shape, a rhombus shape, a triangular shape, or a hexagonal shape, as long as it can be disposed in the printable area. In the present embodiment, the aspect in which the printable area does not have a rectangular shape has been described as an example. However, the present embodiment can also be applied to the rectangular printable area as in Embodiment 1.

In the present embodiment, the reference coordinates are calculated such that the number of marker parts included in the printable area is the maximum. However, a method is also considered which calculates the reference coordinates such that the number of unit blocks included in the printable area is the maximum. In this case, an image obtained by replacing the marker parts of the block arrangement image illustrated in FIG. 22 with the unit blocks may be prepared and the image may be superimposed on the mask image similarly to a case in which the marker parts are used. Then, the number of blocks may be counted. In addition, the method for maximizing the number of marker parts and the method for maximizing the number of unit blocks may be combined with each other. In a case where the reference coordinates at which both the number of marker parts and the number of unit blocks are the maximum are present, the reference coordinates may be used.

According to the above-mentioned process of the present embodiment, it is possible to determine the reference coordinates such that the number of marker parts is the maximum or to determine the reference coordinates such that the number of unit blocks included in the printable area is the maximum. Therefore, it is possible to increase the amount of additional information that can be embedded.

Embodiment 3

In Embodiment 1, the example in which the margin information on borderless printing and bordered printing of the print settings in the printable area information is used to determine the reference coordinates and the unit blocks are arranged on the basis of the reference coordinates has been described. However, information other than the margin information on borderless printing and bordered printing of the print settings may be used in a case where the loss of the unit block may occur. For example, a case in which a stable print area is treated as the printable area is considered. In some cases, in an area, such as the leading end and the rear end of paper, in which a paper feed process and a printing process different from those in a normal area at the center of paper are performed, the accuracy of printing is reduced and it is difficult to ensure a sufficiently high accuracy at the reading. In this case, the reference coordinates are set in the stable print area except the area. In this case, similarly to Embodiment 1, Embodiment 3 can be implemented by a method which stores printable area information including the information of the stable print area in the printer and refers to the printable area information. In addition, similarly to Embodiment 2, the same process as that in Embodiment 2 may be performed using a mask image that has the stable print area provided in a mask portion.

Other Embodiments

In the above-described embodiments, the aspect in which, in a case where the reference position where the additional information is embedded is determined, the position where the largest amount of additional information is embedded is determined has been described as an example. However, the present embodiment is not limited thereto. A position where the amount of additional information greater than a predetermined value is embedded may be determined. Here, the predetermined value may be, for example, the amount of additional information that can be embedded in a case where the reference position described in the above-described embodiments is not determined. That is, the amount of additional information that is more than the amount of additional information that can be embedded in a case where the reference position is not adjusted may be embedded. The reference position may not be the position where the largest amount of additional information is embedded. In addition, a typical example of a case in which the additional information is embedded without adjusting the reference position is a case in which the additional information is embedded continuously from the origin (in general, the upper left corner) of the print image.

In the above-described embodiments, the aspect in which the same additional information is repeatedly embedded in each unit block of the entire print image has been described as an example. However, the present embodiment is not limited thereto. Different kinds of information may be embedded in the unit blocks. Alternatively, the unit blocks may be classified into a plurality of groups. In this case, the same first additional information may be embedded in the unit blocks in a first group and second additional information different from the first additional information may be embedded in the unit blocks in a second group. The first group and the second group may be provided in the print image so as to be close to a predetermined area. Alternatively, the first group and the second group may be dispersively provided. Three or more groups may be provided.

In the above-described embodiments, the aspect in which the area in which the additional information is embedded is a block with a predetermined size has been described. However, the present embodiment is not limited thereto. The area may not be a rectangular area, such as a block, and the additional information may be embedded using a unit area having any shape.

In addition, the additional information may be information with a variable length and the information of the area in which the additional information is embedded in a predetermined position (for example, an initial portion) of the data part of the unit block. For example, in the case of 800 bits, some bits (for example, 80 bits) in an initial part may indicate the range in which the additional information is embedded in the unit block.

The application 400 may define a plurality of rules for embedding the additional information in advance, may embed information for identifying the rule, for example, in a header portion of the initial part of the additional information, and may extract the additional information according to the identified rule.

In the above-described embodiments, the aspect in which the image processing apparatus 100 and the printer 114 are connected to each other by the network and the printer 114 prints the print data generated by the image processing apparatus 100 has been described. However, the present embodiment is not limited thereto. The printer 114 may include the application 400 or the printer 114 may output a printed material in which the additional information has been embedded on the basis of the print data generated by the printer 114. That is, the printer 114 may have the functions of the application 400.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-126765, filed Jun. 28, 2017, which is hereby incorporated by reference wherein in its entirety.

What is claimed is:

1. An image processing method, performed by at least one processor by executing a program stored in a memory, comprising:
    obtaining additional information;
    obtaining size information related to a size of an image and a size of a print medium on which at least a portion of the image is to be printed;
    determining positions of blocks in the image on the basis of the obtained size information; and
    embedding the additional information in each of the blocks of the determined positions,
    wherein in a case where it is determined on the basis of the obtained size information that the image is to be printed with a size larger than the print medium, positions of blocks are determined such that an edge of a block is overlaid on an edge of the print medium.

2. The image processing method according to claim 1, wherein the additional information is embedded in the entire image.

3. The image processing method according to claim 1, wherein the additional information is embedded by changing values of pixels forming the data of the image according to a pattern with a predetermined periodicity.

4. The image processing method according to claim 1, wherein print setting information including the size information is obtained.

5. The image processing method according to claim 4, wherein the size information is margin information of a margin in the print medium on which printing of the image is to be performed.

6. The image processing method according to claim 5, wherein the margin information indicates the setting of bordered printing or borderless printing.

7. The image processing method according to claim 4, wherein area information indicating a printable area corresponding to the print settings indicated by the obtained print setting information is obtained, and positions that vary depending on the printable area indicated by the obtained area information are determined.

8. The image processing method according to claim 7, wherein the area information includes information of a stable print area except a leading end and a rear end of paper.

9. The image processing method according to claim 7, wherein the area information is a mask image indicating the printable area.

10. The image processing method according to claim 1, wherein a position of a starting point of a block is determined in the image in the determining.

11. The image processing method according to claim 1, wherein each of the blocks includes a marker part and a data part.

12. The image processing method according to claim 1, wherein same additional information is embedded in each of the blocks.

13. The image processing method according to claim 1, wherein in the image, each of the blocks are arranged continuously with a same size.

14. The image processing method according to claim 1, wherein, in a case where it is determined on the basis of the obtained size information that the image is to be printed with a size smaller than the print medium, positions of blocks are determined such that an edge of a block is overlaid an edge of the image.

15. A non-transitory computer readable storage medium storing a program which causes at least one processor of a computer to execute:
    obtaining additional information;
    obtaining size information related to a size of an image and a size of a print medium on which at least a portion of the image is to be printed;
    determining positions of blocks in the image on the basis of the obtained size information; and
    embedding the additional information in each of the blocks of the determined positions,
    wherein, in a case where it is determined on the basis of the obtained size information that the image is to be printed with a size larger than the print medium, positions of blocks are determined such that an edge of a block is overlaid on an edge of the print medium.

16. An image processing apparatus comprising:
    at least one processor; and
    a memory storing a program, the at least one processor by executing the program stored in a memory, obtaining additional information;

obtaining size information related to a size of an image and a size of a print medium on which at least a portion of the image is to be printed;

determining positions of blocks in the image on the basis of the obtained size information; and embedding the additional information in each of the blocks of the determined positions, wherein, in a case where it is determined on the basis of the obtained size information that the image is to be printed with a size larger than the print medium, positions of blocks are determined such that an edge of a block is overlaid on an edge of the print medium.

17. The image processing method according to claim 10, wherein, in a case where it is determined on the basis of the obtained size information that the image is to be printed with a size smaller than the print medium, a first position is determined in the image in the determining as the position of the starting point, and wherein, in a case where it is determined on the basis of the obtained size information that the image is to be printed with a size larger than the print medium, a second position different from the first position is determined in the image in the determining as the position of the starting point, such that the edge of the block is overlaid on the edge of the print medium.

* * * * *